(12) United States Patent
Yamazaki

(10) Patent No.: US 7,505,457 B2
(45) Date of Patent: Mar. 17, 2009

(54) METHOD AND APPARATUS FOR PROVIDING AN INTERCONNECTION NETWORK FUNCTION

(75) Inventor: Takeshi Yamazaki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 588 days.

(21) Appl. No.: 11/108,971

(22) Filed: Apr. 19, 2005

(65) Prior Publication Data

US 2005/0238052 A1 Oct. 27, 2005

Related U.S. Application Data

(60) Provisional application No. 60/564,647, filed on Apr. 22, 2004.

(51) Int. Cl.
*H04L 12/50* (2006.01)

(52) U.S. Cl. .................... 370/386; 340/2.28

(58) Field of Classification Search ............ None
See application file for complete search history.

(56) References Cited

U.S. PATENT DOCUMENTS

| | | | |
|---|---|---|---|
| 5,842,034 A * | 11/1998 | Bolstad et al. ......... | 712/11 |
| 5,857,080 A | 1/1999 | Jander et al. | |
| 6,038,233 A | 3/2000 | Hamamoto et al. | |
| 6,493,479 B1 * | 12/2002 | Briggs .................. | 385/17 |
| 6,826,662 B2 | 11/2004 | Suzuoki et al. | |
| 2001/0047421 A1 | 11/2001 | Sridhar et al. | |
| 2003/0061402 A1 | 3/2003 | Yadav | |
| 2004/0010545 A1 | 1/2004 | Pandya | |
| 2004/0264369 A1 * | 12/2004 | Reed et al. ............ | 370/229 |

FOREIGN PATENT DOCUMENTS

WO WO-2004/017220 2/2004

OTHER PUBLICATIONS

Patel, J.H., "Processor-Memory Interconnections for Multiprocessors", Proceedings of the 6th Annual Symposium on Computer Architecture, Philadelphia, PA, USA Apr. 23, 1979-Apr. 25, 1979, pp. 168-177.
Krishnamoorthy A.V. et al., "The Amoeba Chip: An Optoelectronic Switch for Multiprocessor Networking Using Dense-WDM" Proceedings of the Third International Conference on Massively Parallel Processing Using Optical Interconnections, Maui, HI, USA, Oct. 27, 1996-Oct. 29, 1996, pp. 94-100.
Kashyap, V., "IP over InfiniBand (IPoIB) Architecture", IETF Internet Draft <Draft-ietf-ipoib-architecture-03.txt>, Oct. 2003, pp. 1-24.
Pozefsky, D. et al., "Multiprotocol Transport Networking: Eliminating application dependencies on communications protocols", IBM Systems Journal, 1995, vol. 34, No. 3, pp. 472-499, Armink, NY, USA.

* cited by examiner

*Primary Examiner*—Duc C Ho
(74) *Attorney, Agent, or Firm*—Lerner, David, Littenberg, Krumholz & Mentlik, LLP

(57) ABSTRACT

Method and apparatus are provided for improved connection of devices and lower latency of communications between devices of a massively parallel network. In particular, method and apparatus are provided for cross-bar switches, a multiple protocol interface device, a low latency upper communication protocol layer, addressing and remote direct memory access over a massively parallel network.

24 Claims, 18 Drawing Sheets

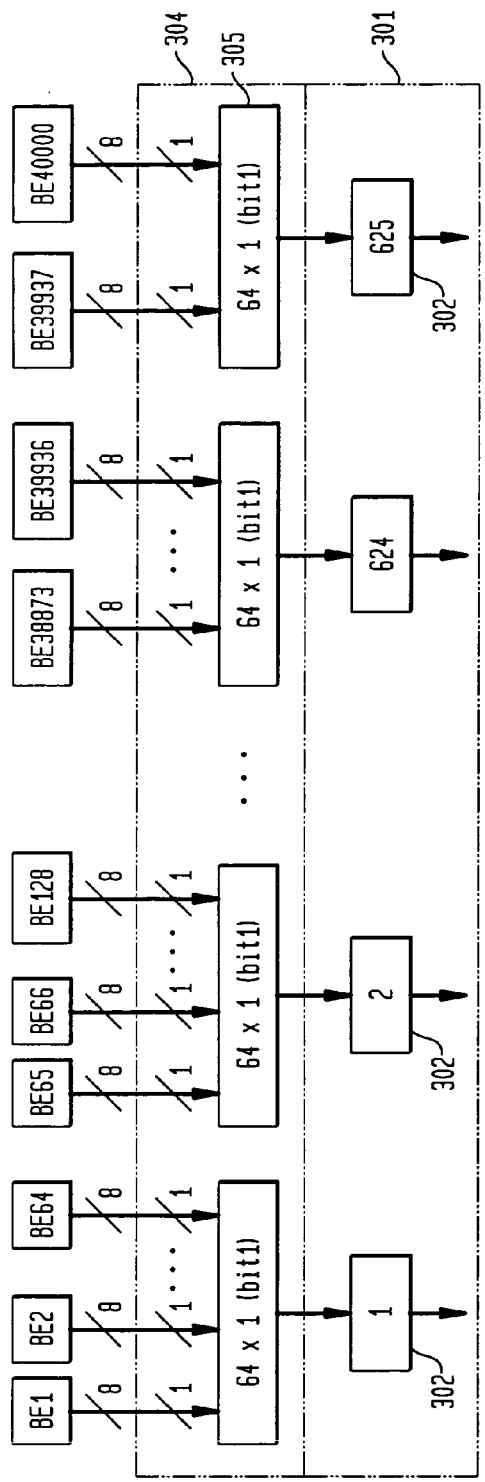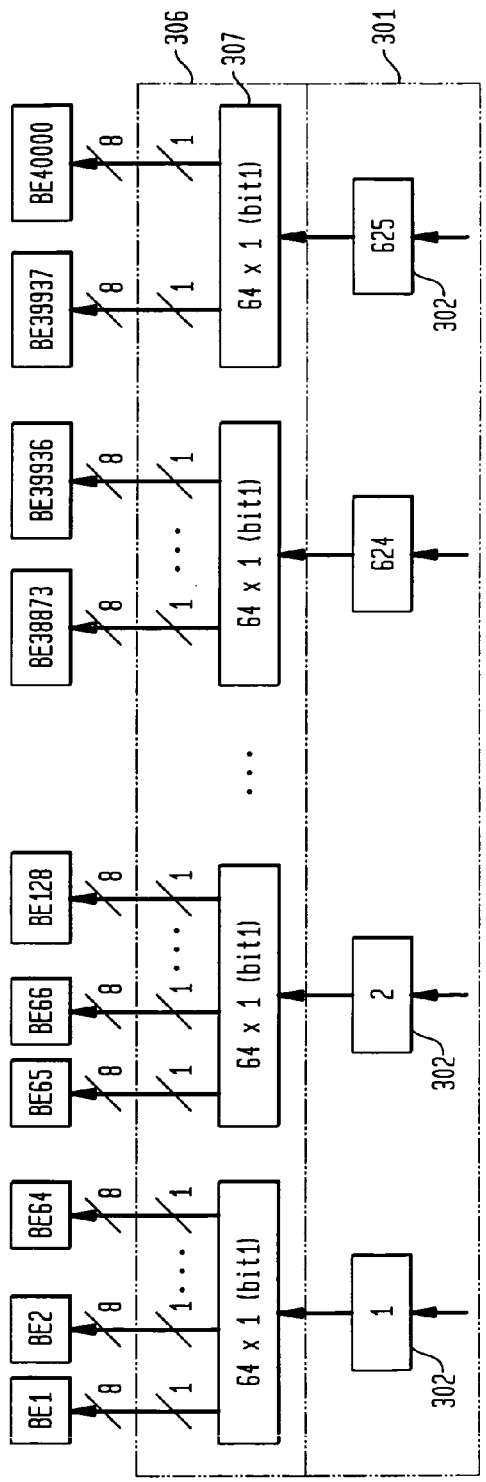

METHOD AND APPARATUS FOR PROVIDING AN INTERCONNECTION NETWORK FUNCTION

CROSS-REFERENCE TO RELATED APPLICATIONS

This application claims the benefit of the filing date of U.S. Provisional Patent Application No. 60/564,647 filed Apr. 22, 2004, the disclosure of which is hereby incorporated herein by reference.

BACKGROUND OF THE INVENTION

The present invention relates to data communications networking.

Despite recent advances in the processing power of individual computers and the speed of accessing them over high-speed communication links, there will always be some computing problems that are larger than any individual computer can handle in a reasonable time on its own. Thus, it is common in some fields such as the design of an aircraft's airframe and the exploration of subterranean petroleum fields to assign a relatively small group of tightly coupled processors, e.g. two to 20 processors, to perform such projects. However, in some cases, the project is too big for such groups of processors to handle.

Some large-scale computing projects (LSCPs) that have been or are being handled by multiple thousands of processors include projects being conducted under the name Search for Extraterrestrial Intelligence (SETI). To further the SETI projects, interested individuals install programs on their personal computers (PCs) instructing their PCs, when otherwise idle, to process portions of data being collected by radiotelescopes. In another example, thousands of individuals installed programs on PCs which were then used to decode a widely used encryption algorithm.

However, in both such cases, the goals of the project were achieved only because the LSCPs were capable of being parsed into smaller micro-projects capable of being handled by processors that operate substantially independently from each other in a loosely coupled network. Neither of these LSCPs required a high degree of collaboration between processors, in the manner that is required to design an airframe or model a subterranean petroleum field, for example. Moreover, neither of the LSCPs requires sharing of information between processors in real-time to support a real-time service.

There are many instances where a high degree of collaboration between processors are required, in real-time for providing services in real-time. One common feature of the LSCPs for both the airframe design and petroleum exploration examples above is that large amounts of image data must be processed in multiple dimensions. Thus, for each point of the image, data representing variables in the three spatial dimensions are processed, as well as variables within other dimensions of time, temperature, materials, stress, strain, etc. The number of variables that are processed multiplied by the number of points within the image (the "resolution") determines the size of the LSCP, such that the size of the LSCP grows geometrically when the number of variables and points are increased.

The simulation of the actual world to a user of a processing system as a "virtual world" is another LSCP which requires a high degree of collaboration between processors and real-time sharing between them to provide real-time services. In particular, a high degree of collaboration and real-time sharing are required to provide a virtual world which simulates the actual world and actual sensory experiences from locations around the world, while providing interactive play. In order to make experiences believable to the user, much sensory data needs to be collected in real-time from actual world sites, and "recreated" when the user "visits" the corresponding virtual site in the virtual world. Thus, data representing experiences such as sights (e.g. current images of the actual world site), current sounds, and indications of temperature, humidity, presence of wind, and even smells must be collected and made available to the user.

Because of lack of a processor network capable of supporting it, such virtual world is an unfulfilled need. It is estimated that the processing requirements for such virtual world would exceed the capabilities of the fastest supercomputer in the world, which is currently the "Earth Simulator", a supercomputer in Japan having a speed of 82 Teraflops/sec, and a latency of 10 µs. The Earth Simulator is believed to be incapable of supporting such virtual world because of high latency, among others. High latency can be caused by high protocol overhead in messaging between processors. Thus, a need exists to provide a network of processors which communicate via a low overhead communication protocol having reduced latency, so as to permit increased collaboration between processors and improved sharing of information in real-time.

FIGS. 1A and 1B illustrate conventional topologies of data communications networks. FIG. 1A illustrates a topology including a cross-bar switch 10, while FIG. 1B illustrates a topology of a hierarchical network 20. The cross-bar switch includes an array of switch fabric elements 14, each having a buffer, for transferring messages between selected ones of a plurality of devices D0 through D3 at an input end 16 and selected ones of a plurality of devices D0 through D3 at an output end 18 of the cross-bar switch 10. As indicated in FIG. 1A, sixteen switch fabric elements 14 are needed to provide full input-output connectivity between four devices D0 through D3. FIG. 1A illustrates a use of the cross-bar switch 10 in transferring messages on a plurality of paths 12 between selected ones of the devices D0 through D3 at the input end 16 and the output end 18. For example, D0 transmits a message to D3 on a path 12, while D1 transmits a message on a path 12 to D2, and so on.

The hierarchical network 20 includes a set of four first stage buffers 22 for buffering communications from each of four devices D0 through D3 and a set of four first stage buffers 24 for buffering communications from each of four communicating elements D4 through D7. The four buffers 22 and the four buffers 24 are connected to two second stage buffers 26 which function to transfer communications between the first stage buffers 22 and the first stage buffers 24.

From the point of view of connectivity, both the cross-bar switch 10 and the hierarchical network 20 provide the same function. Any one of the devices attached to the network can communicate with any other device. However, from the point of view of maximum simultaneous throughput, the cross-bar switch 10 is superior because it includes many switch fabric elements 14 each having a buffer. The theoretical capacity of the cross-bar switch 10 equals the number of switch fabric elements minus one. Stated another way, the theoretical capacity in a 4×4 cross-bar switch such a shown in FIG. 1A is fifteen messages. In actuality, the maximum usable capacity is a percentage of the theoretical capacity, but is still generally within a range of about 60-70% of the theoretical capacity. Hence, about 10 messages can be communicated simultaneously by the cross-bar switch. In another example, suppose that the cross-bar switch 10 interconnects eight devices, having 8×8=64 switch fabric elements. Then, the maximum usable capacity becomes about 0.60* 64=38 simultaneous messages. By contrast, the capacity of the hierarchical network 20 is limited by the number of buffers at the highest level of the network. In the example shown in FIG. 1B, the maximum number of messages that can be simultaneously transmitted over the network 20 is two because there are only two second stage buffers 26. Comparing the two types of networks 10 and 20, the hierarchical network has a maximum capacity (2) which is only about 5% of the maximum capacity (38) of the cross-bar switch 10.

On the other hand, a hierarchical network 20 has superior economy to a cross-bar switch 10 because it has so much fewer switch elements (in the form of first and second stage buffers) and much fewer interconnections between buffers as well. In a hierarchical network 20 which interconnects eight devices as shown in FIG. 1B, only ten buffers 22, 24 and 26 are needed, in place of 64 switch fabric elements that are needed for an 8×8 size cross-bar switch similar to switch 10. While the cross-bar switch 10 provides superior connectivity, it is expensive to implement, as it requires many more switch fabric elements 14 than the hierarchical network 20 requires buffers 22, 24, 26.

Accordingly, it would be desirable to provide a network having a cross-bar switch topology for interconnecting a large number of communicating elements, having high capacity for transmitting simultaneous messages, while reducing the number of switch fabric elements required to implement such network.

FIG. 2 illustrates a configuration of a bridge 30 that is background to the present invention but which is not admitted to be prior art. As shown in FIG. 2, a plurality of devices BE0 through BE3 are connected for communication by a bridge 30 to a switching network 32. The bridge 30 converts messages received from devices BE0 through BE3 using a first communication protocol into messages for transmission onto a switching network 32 using a second communication protocol. Devices BE0 . . . BE3 are desirably those shown and described as "broadband engines" in commonly owned, copending U.S. patent application Ser. No. 09/815,554, filed Mar. 22, 2001 (hereinafter, the '554 Application). The '554 Application is hereby incorporated by reference herein. The BEs have a built-in capability of communicating over a first communication protocol such as that described in the '554 application as the IOIF protocol. However, BEs lack the capability of directly communicating over another protocol stack such as the communication protocol licensed under the name Infiniband™ by the Infiniband Trade Association®. The switching network 32 is desirably a high speed, high capacity, serial communications network, having a topology of a cross-bar switch such as that described above with reference to FIG. 1A. Communications over the switching network 32 are required to be formatted for transport according to the physical link layer 34 of the Infiniband protocol stack. Bridge 30 includes an IOIF adapter 36 for communicating with BEs and an Infiniband adapter 38 for converting communications from IOIF protocol to Infiniband protocol for transport over switching network 32.

Protocol stacks are logically divided into "layers" according to the well-known Open Systems Interconnect (OSI) reference model. According to the OSI reference model, a protocol stack includes, from the bottom up, a physical layer which conveys the bit stream at the electrical level, e.g., the voltages, frequencies and other basic operation of the hardware which supports the network. Next, a data link layer operates above the physical layer. The third layer of the stack, the network layer, handles routing and forwarding of messages at the packet level from one node to other nodes to which it is directly connected. Usually, a fourth layer of the protocol stack, the transport layer, operates above the network layer, the transport layer controlling connections between non-directly connected devices of the network, and providing a mechanism for tracking the progress of transferring packets of a multiple-packet communication across the network.

The management of these protocol stack layers is represented in FIG. 2 as follows. Connected to switching network 32 is an Infiniband physical layer controller 40, managing the physical connection of the bridge 30 to the switching network 32 and performing the transmission and reception of signals. The Infiniband link layer controller 42 operates above the physical layer controller 40, managing link characteristics and providing network layer function. The Infiniband adapter 38 provides transport layer function, controlling communications involving multiple packets and connections between devices BE0 . . . BE3, etc., and other devices across the network 32. The Infiniband adapter 38 is robust, having the capability of maintaining connections such that few communications are dropped or prevented from succeeding.

The bridge 30 used for converting communications between the IOIF protocol and the Infiniband protocol to permit BEs to communicate with devices over the switching network 32 has a serious disadvantage. The upper layers of the Infiniband protocol stack, i.e., all layers above the network layer, have high latency. Stated another way, a multi-packet message being transmitted across the bridge 30 and switching network 32 is slowed down by the operation of the Infiniband adapter 38. As shown and described below relative to FIGS. 3A and 3B, high latency results from the Infiniband protocol needing several preparatory operations to be performed before allowing a message to be transmitted.

The high latency of the Infiniband protocol is undesirable. Large-scale computing projects require simultaneous processing by a large number of BEs, while also requiring the continuity and uniformity of shared memory to be maintained. High latency greatly reduces the efficiency of cooperative computing projects, effectively limiting the number of processors which can cooperate on a large-scale computing project.

Accordingly, it would be desirable to provide a bridge capable of supporting multiple protocol stacks, such that a more streamlined, low latency protocol stack is available for use, as appropriate, when devices such as BEs need to cooperate together on computing projects. In addition, the bridge should still support the upper layers of the Infiniband protocol stack when needed.

BEs communicate with each other over an input output interface ("IOIF") to which they are attached. When BEs are directly attached to the same IOIF, the BEs are said to be "local" to the IOIF, or just "local BEs". When BEs are not directly attached to the same IOIF, communications between them must traverse one or more networks, e.g., a switching network. In such case, the BEs are said to be "remote" from each other, or just "remote BEs".

An IOIF communication protocol governs communications over the IOIF. The IOIF protocol provides a high degree of supervision of message traffic, which is beneficial for tracking communications across the IOIF.

It is desirable for BEs to utilize the IOIF protocol to communicate messages between remote BEs disposed at locations of the network requiring many machine cycles to reach. One goal is that communication between such remote BEs occurs without high latency. As mentioned above, high latency limits the ability of processors within a network to cooperate together on a large-scale computing project.

A particular example of communicating over a network using the IOIF communication protocol is illustrated in FIGS. 3A and 3B. The information shown in FIGS. 3A and 3B is background to the present invention, but is not admitted to be prior art. In FIGS. 3A and 3B, elapsed time runs in a vertical direction from the top to the bottom. FIG. 3A illustrates a read operation performed by a BE 50 acting as a master device. In this operation, BE 50 reads from a BE 54 acting as a slave device across the IOIF 52. As shown in FIG. 3A, a read command 56 is issued by the BE 50 when it has permission to present the command. This occurs after initial permission-establishing protocol signals 57, 58 and 59 are presented in that order. Following receipt of the read command, the BE slave device 54 performs operations 60, 61 and 62, and then returns an acknowledgement (ACK) 64. The BE slave device 54 also prepares the requested read data for presentation to the IOIF 52. However, the BE slave device 54 waits to provide the read data across the IOIF 52 until the ACK 64 has been delivered to the BE master device 50. In a cycle 68, subsequent to the delivery of the ACK 64, the data requested by the read command is delivered to the BE master device 50.

Similarly, FIG. 3B illustrates a write operation performed by a BE 50 acting as a master device to a BE 54 acting as a slave device, across the IOIF 52. As shown in FIG. 3A, a write command 156 is issued by the BE 50 when it has permission to present the command, after initial permission-establishing protocol signals 57, 58 and 59 are presented in that order. Then, at 155, the master BE 50 prepares data for transmission across the IOIF 52. Following receipt of the write command, the BE slave device 54 performs operations 160, 161 and 162, and then returns an acknowledgement (ACK) 164. During this time, the IOIF 52 also provides a "data credit" to the master BE 50, allowing it to transmit the write data across the IOIF 52. However, the master BE 50 must wait until the ACK 64 has been delivered before the write data can be transferred to the slave BE 54. In cycle 168, subsequent to the delivery of the ACK 64, the write data is delivered across the IOIF 52 to slave BE 54.

In large-scale networks, it is desirable to communicate messages between nodes with sufficient address bits to uniquely identify every node on the network. Otherwise, such networks must be broken up into smaller subnetworks having independent addressing domains, and a latency cost will be incurred when traversing various addressing domains between communicating devices. However, the number of addressing bits used by a physical hardware layer of a communicating device is always limited. It would be desirable to provide a way of converting communications between communicating devices from having a limited number of address bits to having a larger number of address bits used for communications in the large-scale network.

Moreover, communicating devices may need read access to any data stored in any directly accessible memory device of a large-scale network. It would be desirable to provide a way for a communicating device to perform a global remote direct memory access (global RDMA) from any other memory available to it on the network.

SUMMARY OF THE INVENTION

Method and apparatus are provided for improved connection of devices and lower latency of communications between devices of a network. In particular, method and apparatus are provided for cross-bar switches, a multiple protocol interface device, a low latency upper communication protocol layer, and improved addressing and remote direct memory access over a network such as a large-scale network.

BRIEF DESCRIPTION OF THE DRAWINGS

FIGS. 4 through 21 illustrate devices and methods according to preferred embodiments of the present invention.

DETAILED DESCRIPTION

Figure 1A:
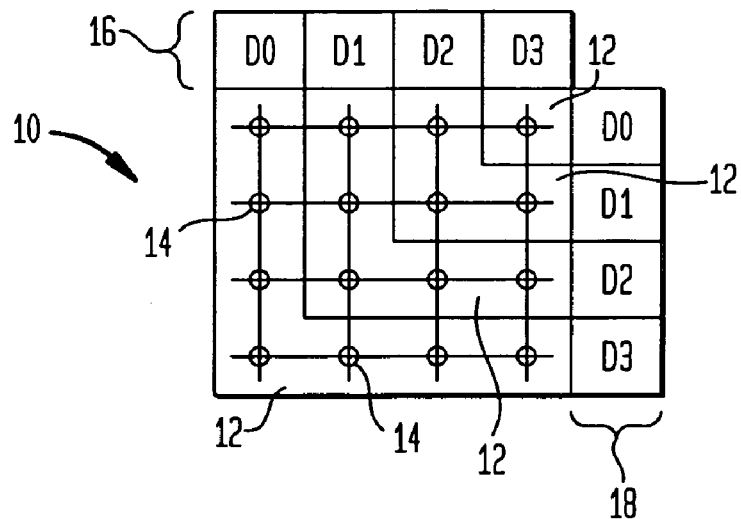
FIGS. 1A-3B illustrate devices and methods which are background to the present invention.
Figure 1B:
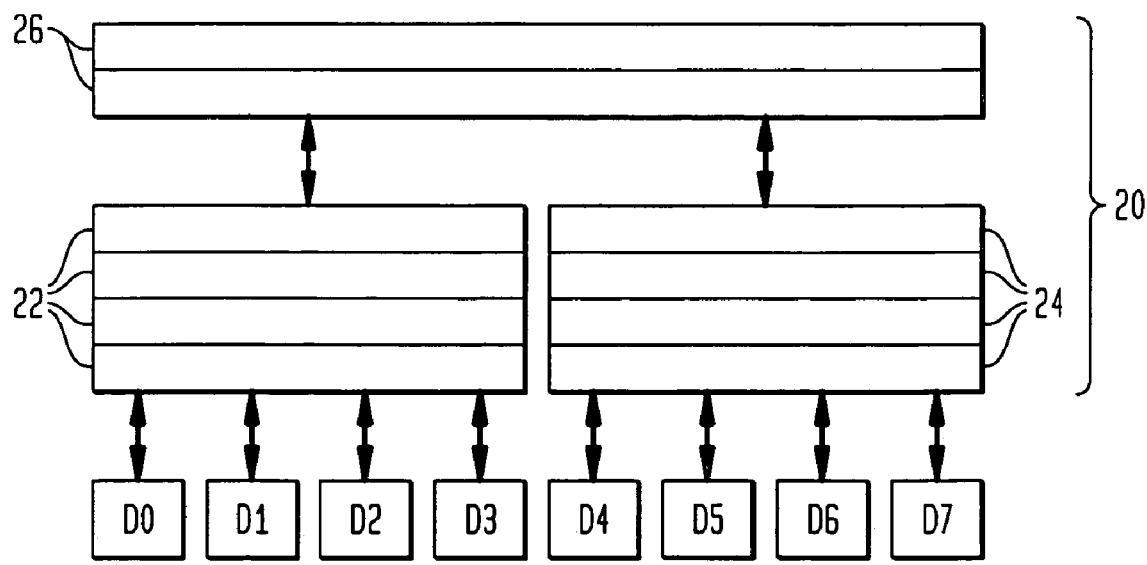
Figure 2:
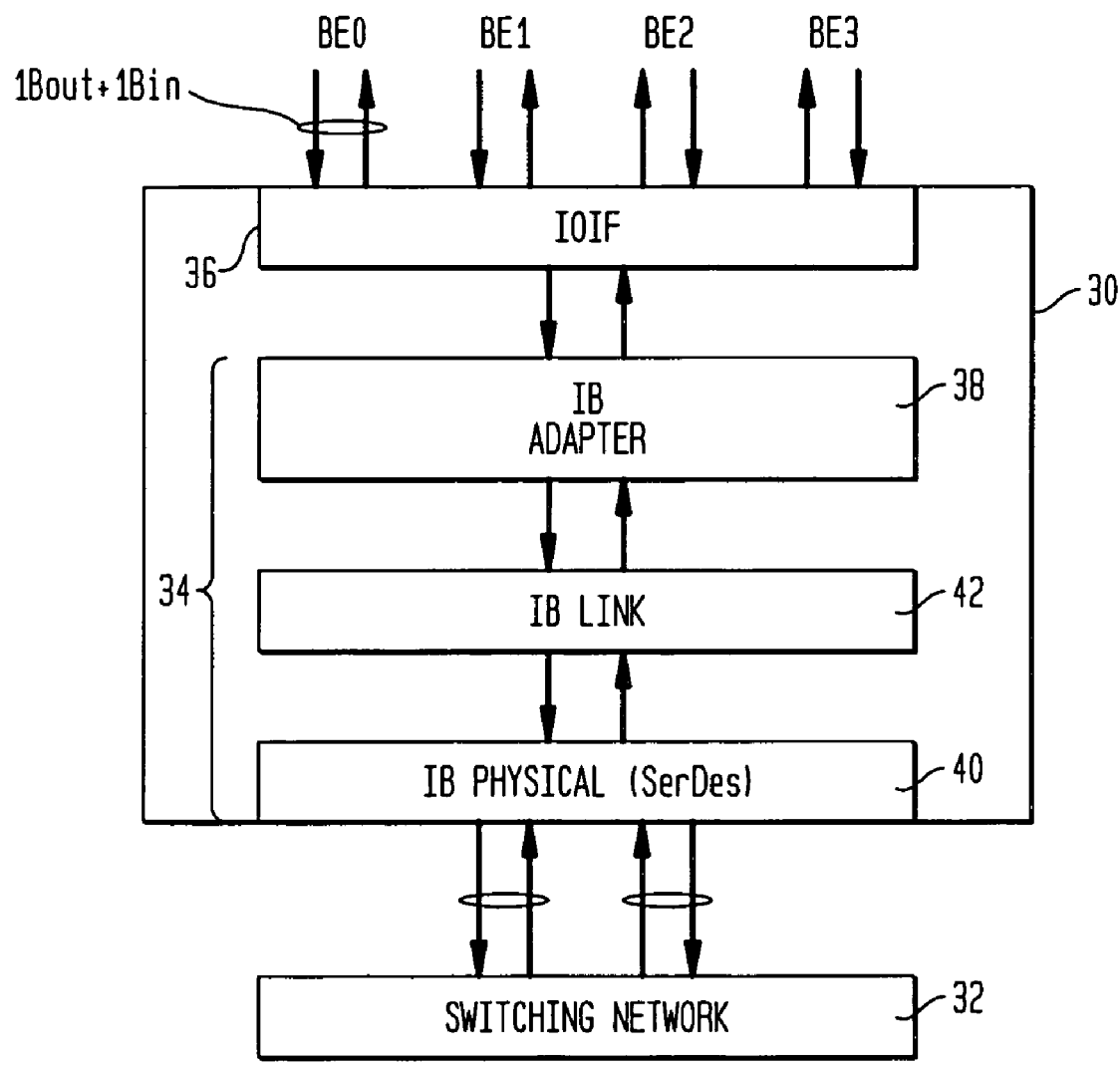

Embodiments of the invention shown and described herein relative to FIGS. 4-14 are directed to systems and methods for providing interconnection between processors and between processing systems such as broadband engines (BEs). Desirably, the systems of methods according to the following described embodiments facilitate a high degree of collaboration between processors and/or BEs, and reduce latency for transporting messages between devices and BEs of the network.

One possible application for such interconnection systems and methods is for a "networked computing environment (NCE)". The NCE is a computing environment having a heterogeneous network including a large number of nodes, which can be operated in a massively parallel manner on a large-scale computing project (LSCP). Among types of nodes in the NCE are server computers (either large or small-scale servers), personal digital assistants (PDAs), consoles (e.g. video game machines, set top boxes), web cameras, home servers, servers, etc. The NCE preferably includes nodes capable of processing applications and data organized into software cells, as described in the '554 Application, such nodes hereinafter referenced as "cell architecture" or "CA" computers. CA computers share certain features in common, these being a common architecture having at least a common basic instruction set, and a streamlined communication protocol. CA computers can be small, having one to a few processors and few resources, or can be midsize computers or even large computers, having very many processors and resources. All CA computers have a generally similar processor organization and communication interface, which allows for more efficient communication and collaboration between computers. Communications between CA computers are generally capable of traversing network interfaces such as adapters, bridges and routers more rapidly than non-CA computers.

An NCE can provide the supporting computing infrastructure for services including a "shared virtual world". The shared virtual world is a computer-implemented environment providing simulated sensory experiences which mimic the real world in a believable manner to a user. The shared virtual world enables interactive play with computer-generated characters, whose characteristics, movement and behavior are generated through artificial intelligence. To simulate such experiences, much data is collected from a sensor network including images, sounds, and current weather conditions from locations in the real world. Data is also collected from sensors attached to a human user to detect the user's movement, or to detect the movement of a robot in response to the actions of the user.

A particular requirement of the NCE is the capability to be dynamically reconfigured. When nodes are added or removed, there should be no effect on the services that are provided. In addition, when a particular service is added or removed from the network, it should not affect the services provided by the network.

Accordingly, embodiments of the invention described herein are directed to providing improved interconnection systems and methods for communicating messages between communicating elements of the network, especially those devices including processors that cooperate together on a large-scale computing project.

Figure 4:
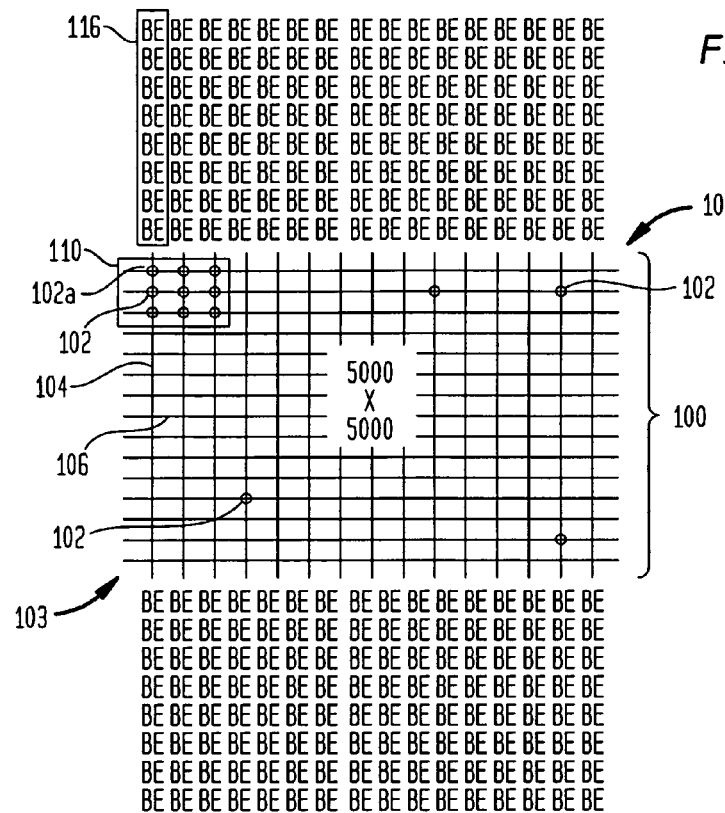

FIG. 4 illustrates an embodiment of a large-scale network of devices, preferably being broadband engine (BE) devices, such as those shown and described in the '554 application. The particular type of device interconnected by the network is not essential, and can take the form of any device operable to transmit and receive data communications. For example, devices interconnected by the network typically include a hardware and/or software enabled processor. As shown in FIG. 4, a cross-bar switch 100 interconnects the BEs. The cross-bar switch 100 has a cross-bar array of in-line communication paths, shown as vertical lines 104, in the direction between the BEs disposed at the top end 101 and those disposed at the bottom end 103 of the switch 100. The cross-bar switch 100 also includes transverse communication paths, shown as horizontal lines 106, in directions generally transverse to the in-line communication paths. Together, the in-line and transverse communication paths provide interconnection between each of the BEs shown at the top end 101 of the cross-bar switch and each of the BEs shown at the bottom end 103 of the cross-bar switch.

At the intersection of the in-line and transverse communication paths are switch fabric elements ("SFEs") 102, one SFE being provided for each intersection. As shown, the cross-bar switch includes an array of SFEs having 5000 SFEs 102 in the vertical direction, and 5000 SFEs 102 in the horizontal direction, for a total size of 5000×5000 SFEs, i.e. 25 million SFEs.

Figure 5:
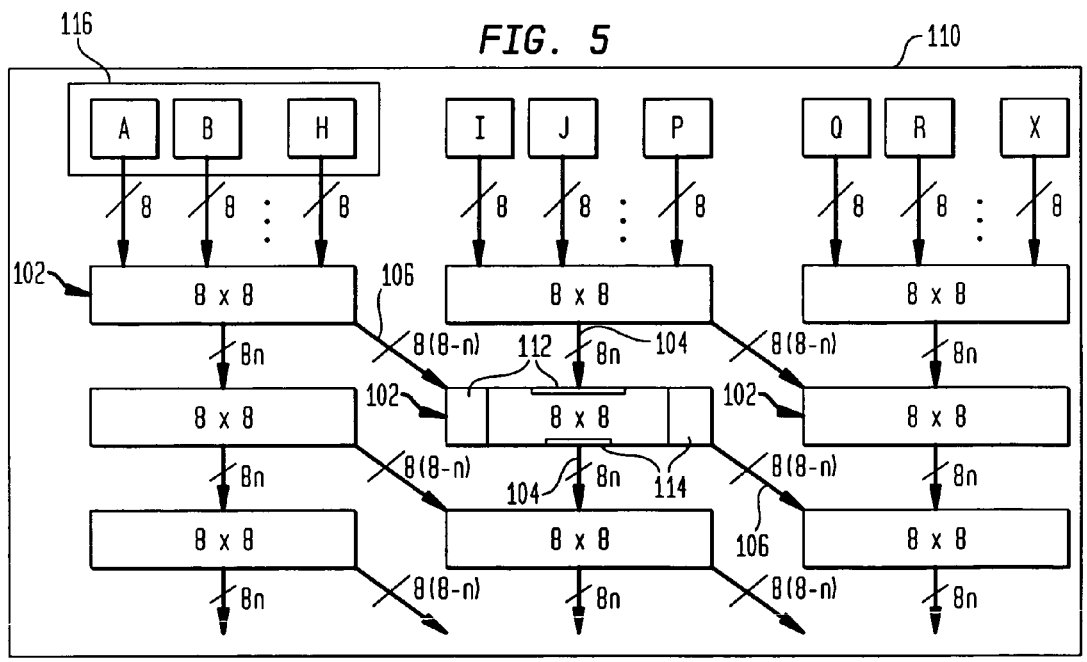

As shown in FIG. 5, each SFE 102 of the cross-bar switch 100 has two input interfaces 112 and two output interfaces 114. One of the input interfaces 112 and one of the output interfaces 114 are coupled to inline communication paths 104, and one of the input interfaces 112 and one of the output interfaces 114 are coupled to transverse communication paths 106. In the embodiment shown in FIG. 5, each of the input interfaces and output interfaces have eight ports, wherein each port handles eight bit parallel data. Thus, as shown in FIGS. 4 and 5, a group 116 of eight BEs, each communicating over an eight bit parallel data interface, are connected to one SFE 102 at the top end 101 of the cross-bar switch 100. Each SFE 102 preferably has the same structure and operates the same way as every other. Thus, each SFE 102 is capable of simultaneously handling eight simultaneous messages, each message having a bit width of eight bits.

Further, as there are 5000 SFEs 102 in the horizontal direction connected to BEs at the top end 101 of the cross-bar switch 100, and each SFE is connected to eight BEs, a total of 40,000 BEs are connected to the top end 101 of the cross-bar switch. In like manner, a total of 40,000 BEs are connected to the bottom end 103 of the cross-bar switch.

Typically, a cross-bar switch is used to provide cross-connections between the communicating elements attached thereto. Therefore, the same 40,000 BEs that are connected to the top end 101 of the cross-bar switch 100 are also connected to the bottom end 103. Thus, the cross-bar switch 100, having 25 million SFEs 102, has been shown to provide cross-connections between each of 40,000 BEs.

It is desirable that communications traverse an interconnection network in a short period of time while still preserving complete interconnection between every device connected by the network and every other such device, while maintaining high network capacity. Therefore, it is desirable to reduce the number of hops that a message requires to traverse a network. A cross-bar switch having a novel layout of inline and transverse communication paths can help further these goals.

Figure 6:
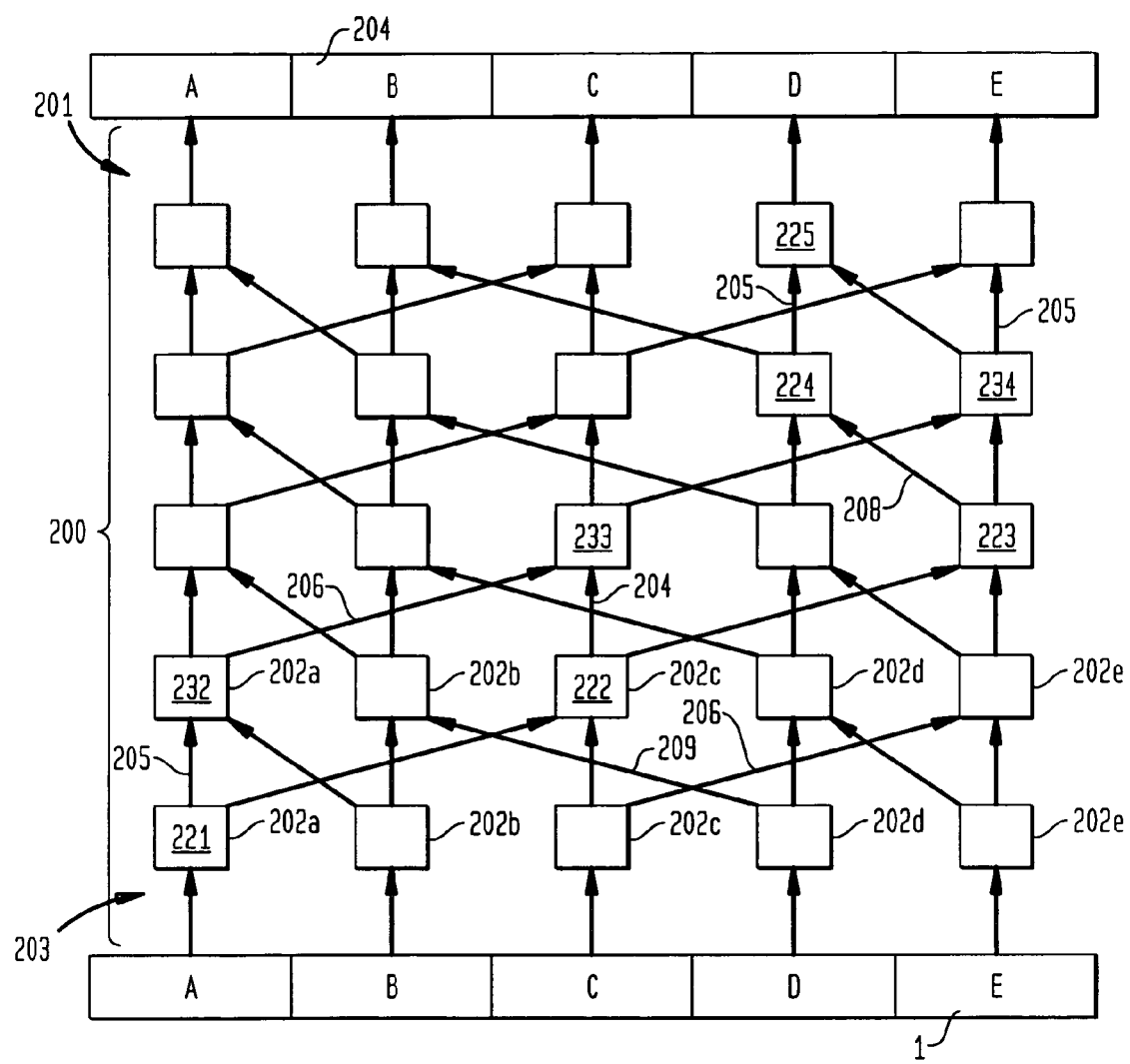

As shown in FIG. 6, a cross-bar switch 200 is shown having a size of 5×5 SFEs (shown variously as 202a-202e), by way of illustration. The principles of interconnection shown therein are applicable to a cross-bar switch of much larger size, such as switch 100 (FIG. 4) having a size of 5000×5000 SFEs.

The direction of traffic through switch 200 is from bottom 203 to top 201. A group 204 of devices A through E are connected to both the bottom 203 and top 201 of the switch 200.

As shown in FIG. 6, the interconnection of each SFE 202a . . . 202e varies in relation to the position of the particular SFE within the switch 200. As in the embodiment described above with reference to FIGS. 4 and 5, each SFE has an output interface (not shown) connected to an inline communication path 205 and another output interface (not shown) connected to a transverse communication path. While all SFEs are connected to inline communication paths 205, they vary as to the type of transverse communication paths to which they are connected. As shown, the SFEs 202a located along the left edge of the cross-bar switch 200 are connected to transverse communication paths 206 which connect to SFEs 202c two places to the right and one place up in the switch 200. Similarly, SFEs 202c are connected to transverse communication paths 206 which connect to SFEs 202e that are two places to the right and one place up in the switch 200. In such manner, SFEs 202a and 202c provide transverse connectivity through the switch 200 in a left-to-right direction.

Connectivity across the switch 200 in the right-to-left direction is provided as follows. Since connectivity in the left-to-right direction is provided only in increments of two places, in order to assure full connectivity in the switch 200, connection in the right-to-left direction must include at least some hops of only one place each. Accordingly, SFEs 202b, 202d and 202e are connected to SFEs 202a, 202b, and 202d, respectively, that are located one place to the left, two places to the left and one place to the left, respectively, and all one place up in the switch 200.

An example of operation of the switch shown in FIG. 6 is as follows. Assume that a message is transferred from a device A to another device D. In a first cycle, an SFE 221 receives the message from element A and presents it on the output interface to the transverse communication path 206. SFE 221 determines from a header of the message that the message must traverse the switch 200 in the left-to-right direction. In the second cycle, SFE 222 receives the message from SFE 221 on the communication path 206 and presents it on the output interface to the transverse communication path 206 connected to SFE 223. Here again, SFE 222 determines from a header of the message that the message has not yet traversed the switch 200 sufficiently in the left-to-right direction and, therefore, that the message still needs to traverse the switch 200 farther in that direction. In the third cycle, SFE 223 receives the message from SFE 222 on the communication path and presents it on the output interface to the transverse communication path 208 attached to SFE 223. Here, SFE 223 determines from a header of the message that the message has traversed the switch 200 sufficiently in the left-to-right direction and now needs to traverse the switch 200 in the right-to-left direction. In the fourth cycle, SFE 224 receives the message from SFE 223 on the communication path 208 and presents it on the output interface to the inline communication path 205 attached to SFE 224. Here, SFE 224 determines from a header of the message that the message is now in a position for traversing the network inline and therefore presents the message on the output interface to the inline communication path. In the fifth and final cycle, SFE 225 receives the message from SFE 224 and presents it on its output interface to device D.

Many different paths are available for messages to traverse the cross-bar switch 200. For example, the message could traverse the network on a path through SFEs 221, 232, 233, 234 and 225; or alternatively, a path through SFEs 221, 222, 233, 234 and 225; or alternatively, a path through SFEs 221, 222, 223, 224 and 225. If the cross-bar switch 200 were larger, the number of available paths would increase further. Having different paths available for traversing the switch tends to increase the availability and capacity of a cross-bar switch for simultaneous communications.

Figure 7A:
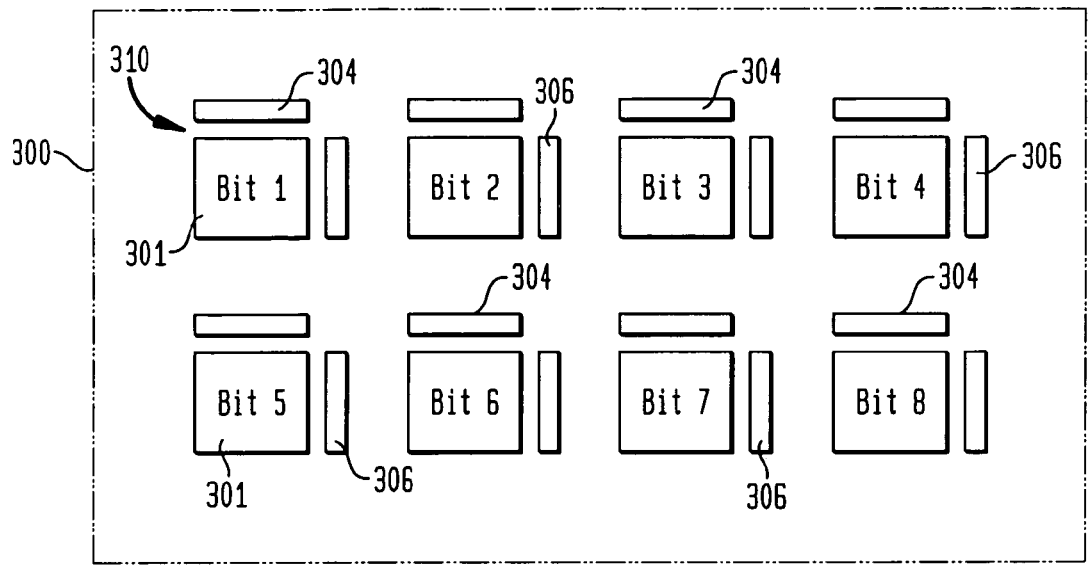
Figure 7B:
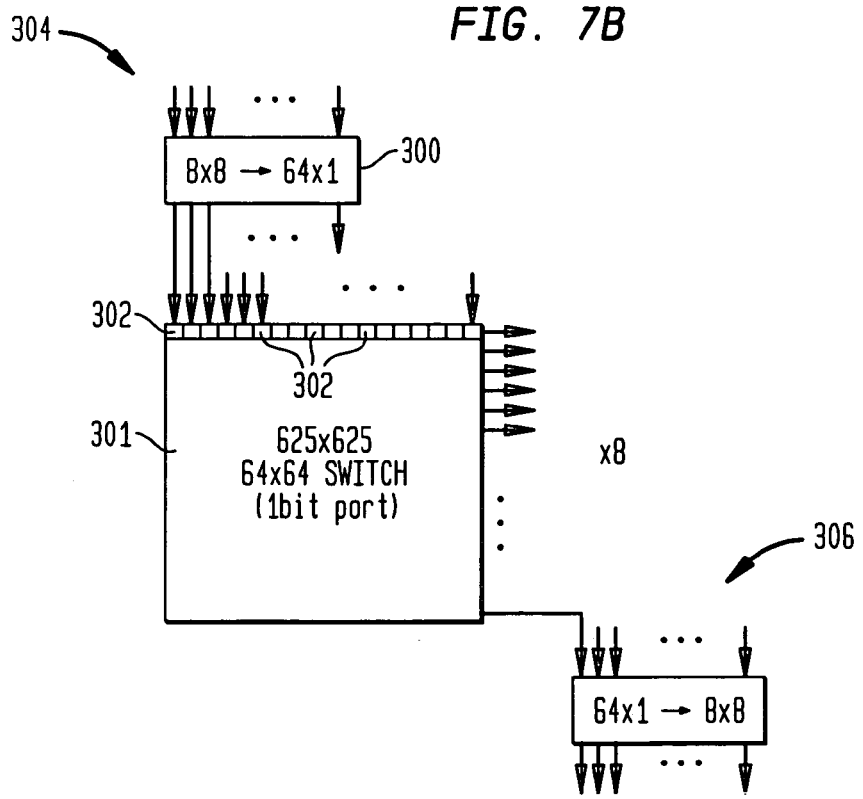

FIGS. 7A-7B illustrate an alternative embodiment of a cross-bar switch 300 for interconnecting the same number (40,000) of BEs as the switch 100 shown and described relative to FIGS. 4-5, but which requires much fewer SFEs to implement and has lower latency. Switch 300 conserves hardware by use of SFEs 302 configured differently from the SFEs 102 of switch 100, such that each SFE 302 is capable of carrying a greater number of messages simultaneously. However, the total number of bits inputted to each SFE 302 and outputted from each SFE 302 of the switch 300 are the same as those of SFE 102. Referring again to FIG. 5, the SFEs 102 shown therein are configured to have eight ports at each input interface and eight ports at each output interface, wherein each port handles eight parallel data bits. By contrast, the SFEs 302 of a switch array 301 of switch 300 are configured to have 64 ports at each input interface and 64 ports at each output interface, wherein each port handles only one data bit at time. By virtue of the eight-fold increase in the number of simultaneous messages handled by each SFE 302, the number of SFEs in each direction of the switch array 301 can be reduced by a factor of eight. Accordingly, as shown in FIG. 7B, the size of the switch array is now 625 SFEs by 625 SFEs.

Desirably, each SFE 102 of switch 100 (FIG. 4) and each SFE 302 of switch 300 is implemented by an integrated circuit or portion of an integrated circuit having a modular design which is reconfigurable. Thus, a change in the reconfigurable design results in the particular types of SFEs 102 and 302 having eight ports and 64 ports, respectively.

As indicated, cross-bar switch 300 has one-bit wide communication paths through switch arrays 301. In order for the cross-bar switch to accommodate BEs having eight-bit parallel data interfaces, specific provision must be made. The solution is as shown in FIG. 7A. The cross-bar switch 300 is actually a group of eight cross-bar switches 310 each including a switch array 301. Each of the eight cross-bar switches 310 handles a different Bit X of the eight bits of parallel data Bit 1 . . . Bit 8 of each message transferred between BEs. Thus, each cross-bar switch 310 interconnects 40,000 BEs, but only for one bit of the eight simultaneously transmitted bits of each message.

The number of SFEs conserved by the configuration of cross-bar switch 300 over switch 100 is as follows. As there are eight switch arrays 301 each having 625×625 SFEs, the total number of SFEs in the switch arrays is 8×625×625=3.125 million, a factor of eight less than the 25 million SFEs 102 in cross-bar switch 100.

However, an input end element 304 and an output end element 306 also need to be provided in each cross-bar switch 310, in order to convert communications from the one-bit format of the cross-bar switch array 310 to the eight bit parallel data format of the BEs and vice versa. FIG. 8 illustrates an exemplary input end 304 for one of the cross-bar switches 310 that handles bit 1 of the eight bit parallel data. As shown in FIG. 8, the input end 304 provides connections to 40,000 BEs through 625 converters 305, each converter 305 having 64 one-bit ports per input interface and 64 one-bit ports per output interface. Each converter 305 is connected to one of the SFEs 302 of the switch array.

As shown in FIG. 9, the output end 306 provides connections to 40,000 BEs through 625 converters 307, each converter 307 having 64 one-bit ports per input interface and 64 one-bit ports per output interface. Again, each converter 307 is connected to one of the SFEs 302 of the switch array 301. Desirably, each converter 307 has the same construction as each converter 305, in order to facilitate interchangeability of hardware for each switch 300.

Figure 10:
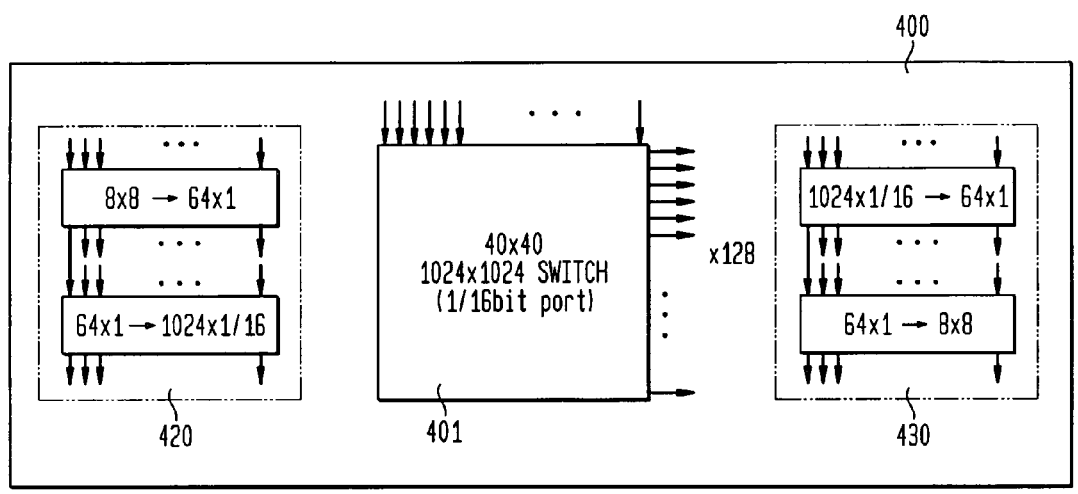
Figure 11:
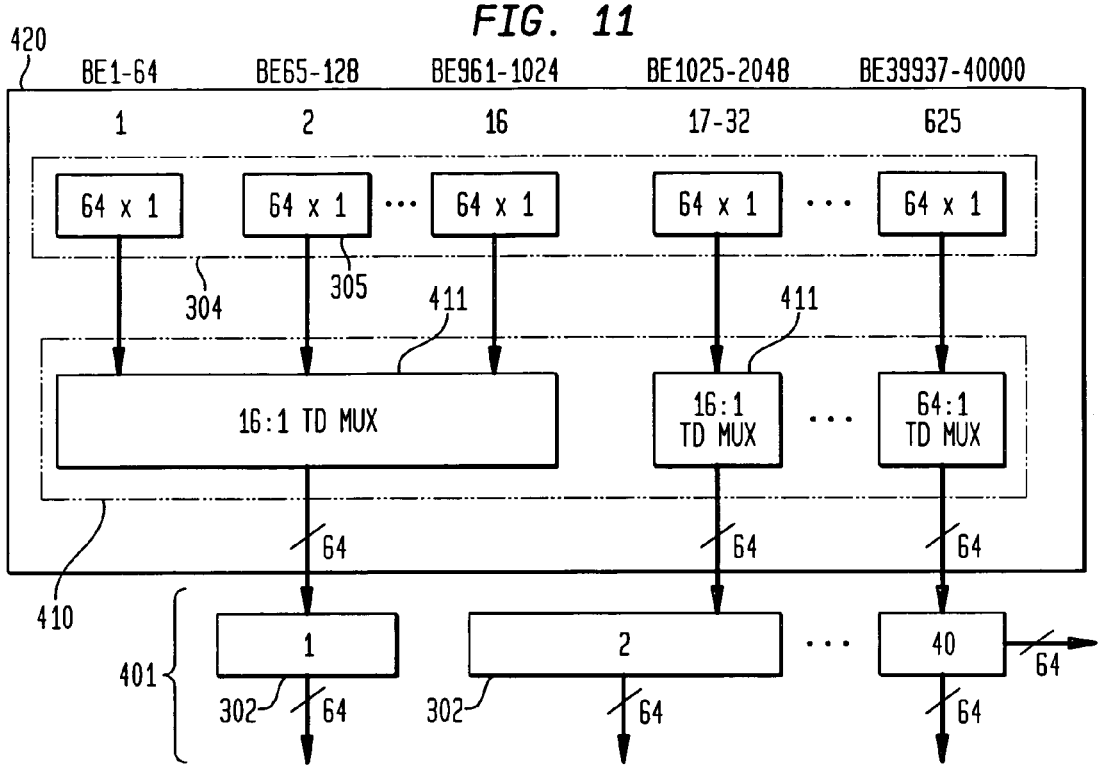
Figure 12:
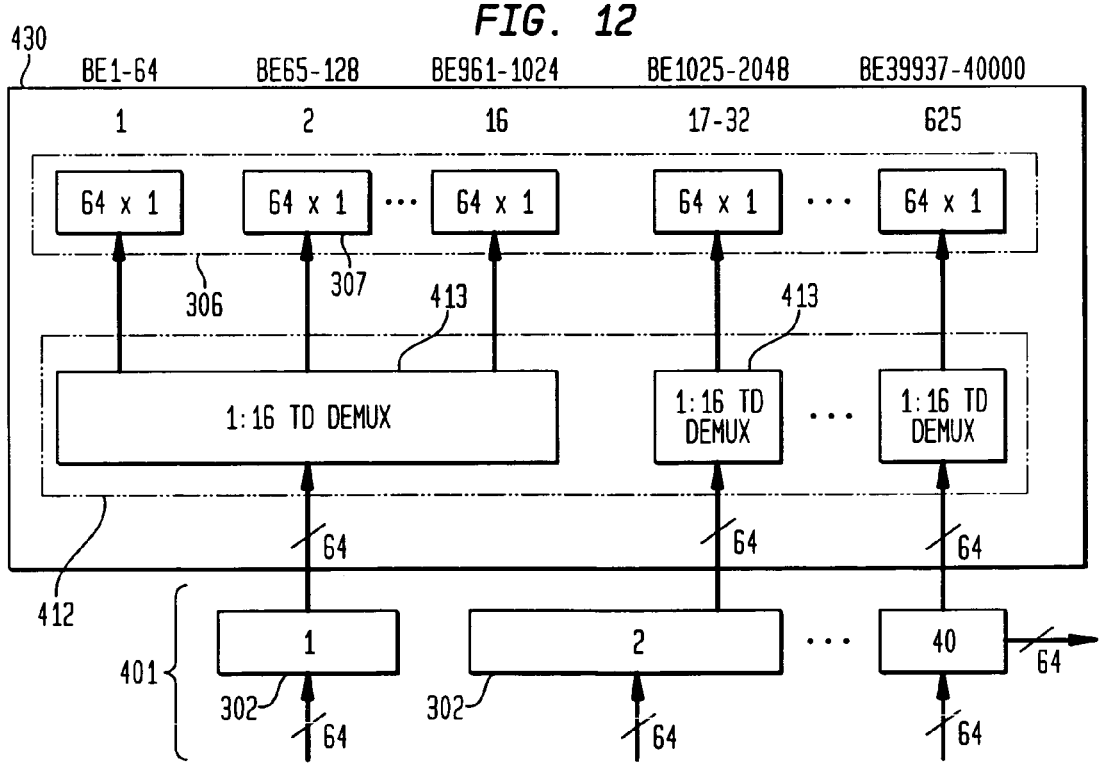

FIGS. 10-12 illustrate yet another embodiment of a cross-bar switch 400 of the invention which provides for further reduction in the number of SFEs 302 required to implement the switch, while preserving the same amount of connectivity in the switch. FIG. 10 is a block diagram illustrating the cross-bar switch 400. Cross-bar switch 400 is actually a group of 128 cross-bar switches, each including a switch array 401. Each switch array, in turn, includes a 40 element wide by 40 element tall array of SFEs 302 (FIG. 11), each SFE being as described above with reference to FIGS. 7A-7B. Namely, each SFE 302 has 64 ports per each input interface and 64 ports per each output interface. Each SFE 302 transfers one bit through each port. Switch 400 is arranged for transporting messages between 40,000 BEs, as described in the above embodiments, but does so on a time-division multiplexed basis. Each of the 128 switch arrays 401 of the switch 400 is connected for enabling communication between each of the 40,000 BEs. However, each switch array 401 transfers only one of the eight bits of parallel data communicated by a BE. Further, each switch array 401 transfers data at a rate of only $\frac{1}{16}$ bit per cycle from each of the BEs connected thereto. For this reason, there are 16 times as many switch arrays 401 in this embodiment compared to that shown and described above relative to FIGS. 7A through 9. Together, the 128 switch arrays 401 transfer data at the same rate as switch 100 (FIG. 4) and at the same rate as switch 300 (FIG. 7A).

FIG. 11 illustrates an arrangement at the input to a switch array 401 of switch 400. An input end 304 having the same construction as that shown and described above relative to FIG. 8 has converters 305 which convert 8-bit parallel data from BEs to one-bit data for transport over the SFEs 302 of the switch array 401. The input end 304 is connected to a time multiplexer unit 411, which in turn, is connected to the switch array 401 having a 40×40 array of SFEs 302.

Connected to the output of every 16 converters 305 is a 16:1 time division multiplexer (MUX) 411. Forty such MUXes 411 are provided in multiplexer unit 410. MUX 411 takes the 1024 bits that are output from 16 converters 305 and multiplexes them in the time domain as $\frac{1}{16}$ bit per cycle onto 64 output lines for input to the 64 ports of one input interface of the SFE 302 attached thereto.

At the output end of each switch array 401, demultiplexing in the time domain is performed by a demultiplexer unit 412 having 40 time division demultiplexers (DEMUX) 413. Each of the DEMUXes takes the 64 bits output from an SFE 302 attached thereto and demultiplexes the bits in the time domain onto 1024 output lines that go to the converters 307 of the output end 306.

Since each switch array 401 has 40×40=1600 SFEs and there are 128 switch arrays, a total of $$1600 \times 128 = 204{,}800 \text{ SFEs}$$

are required to implement the switch arrays of switch 400. This compares favorably to the 25 million SFEs required by switch 100 and the 3.125 million SFEs required by switch 300. Note also that switch 400 has the same connectivity and same capacity for simultaneously transporting messages as switch 100 and switch 300. Switch 400 transfers the same number of bits per cycle as switch 100 and switch 300 do, but with 122 times fewer SFEs. However, since each switch array 401 has only 40 SFEs on a side, compared to 625 SFEs of switch 300 and 5000 SFEs of switch 100, latency is reduced by factors of 16 and 122, respectively.

Figure 13:
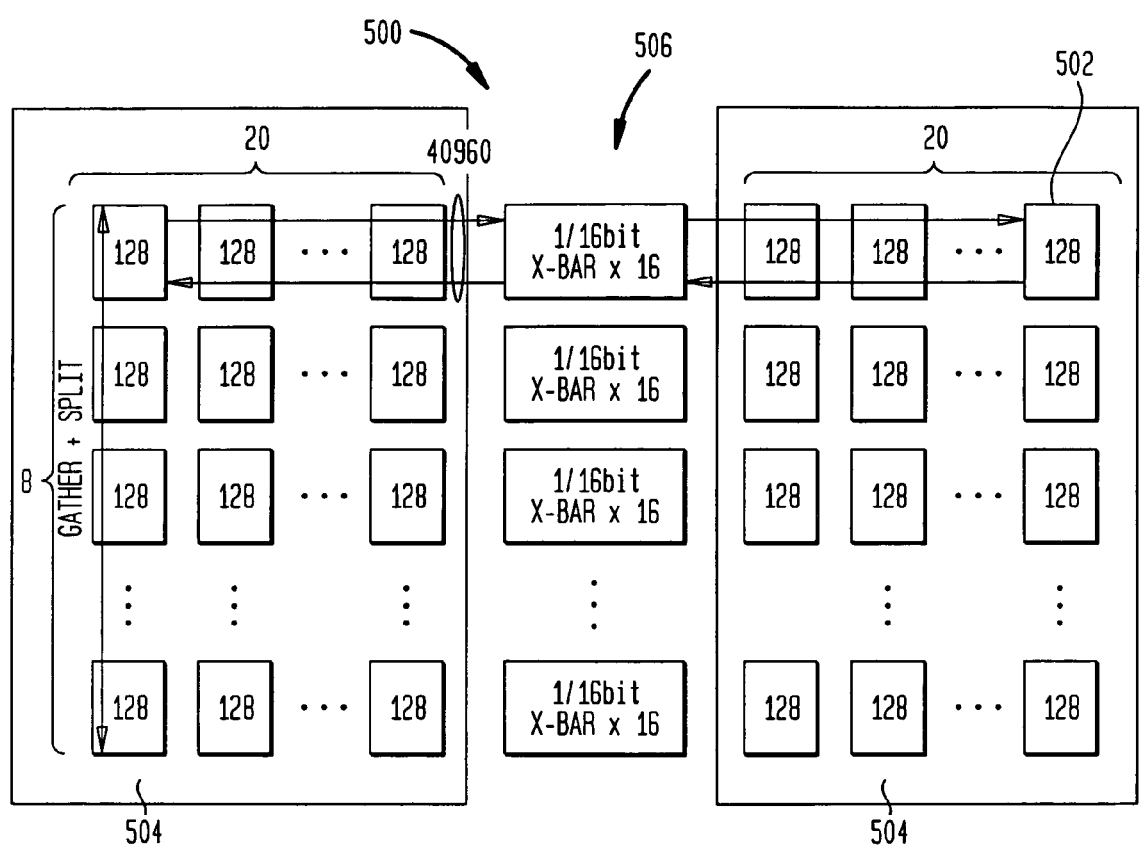

FIG. 13 illustrates a preferred embodiment of a massively parallel network 500 having 40,960 BEs, all of which are interconnected for low-latency communication, such as for the purpose of cooperating together on large-scale computing projects. The 40,960 BEs are arranged in interconnected groups 502, each group having 128 BEs. The groups 502 are provided in two arrays 504, each array 504 having eight rows and 20 columns of the groups 502. Between each of the arrays 504 a column 506 of cross-bar switches are provided, each cross-bar switch having an organization such as cross-bar switches 100, 300 and 400, preferably being organized as switches 400 (FIG. 10). The network 500 utilizes a "gather and split" approach to transfer communications along columns and rows of the network between BEs in groups that can be local within an array 504 or remote (across switches 506).

Figure 14:
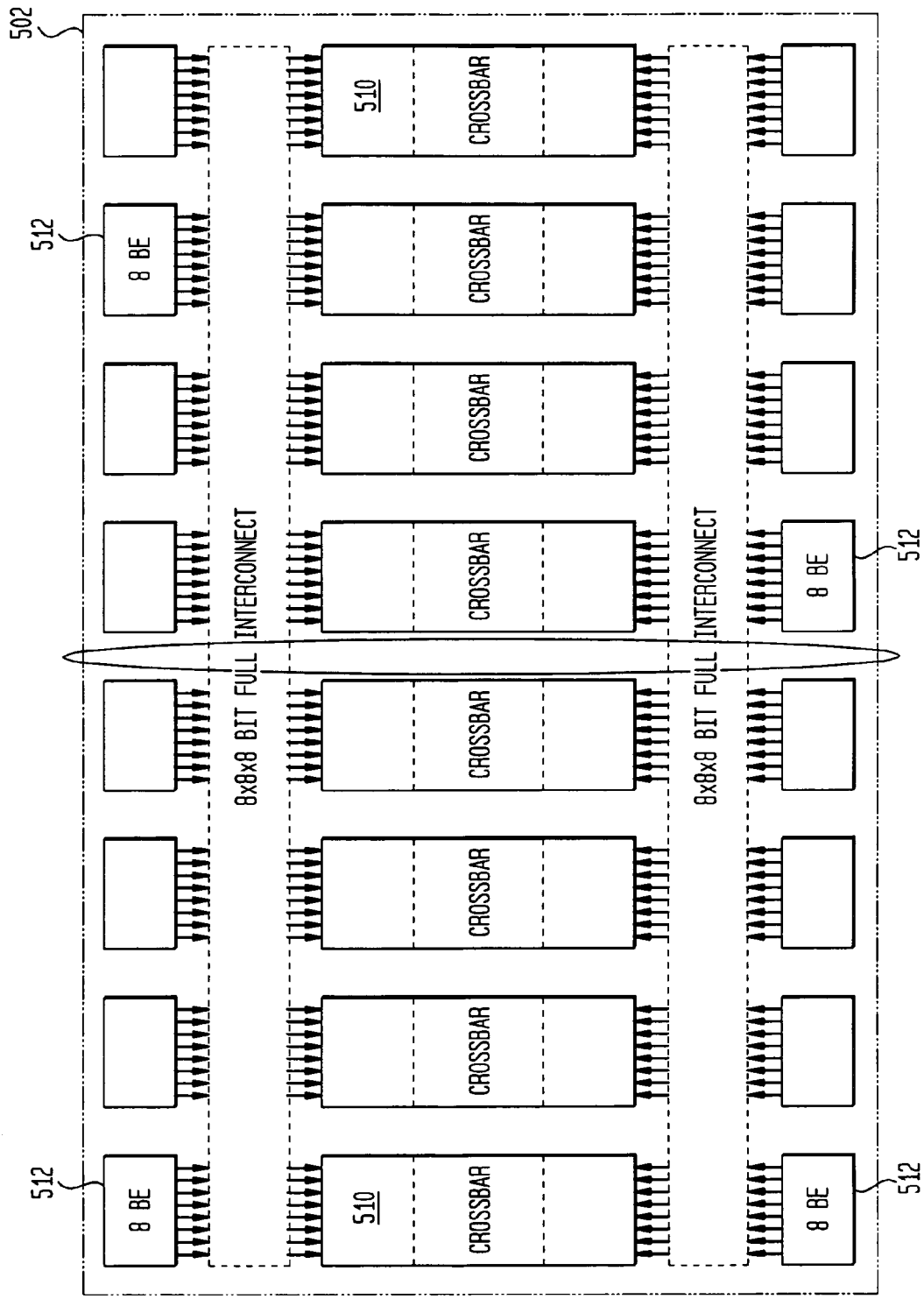

FIG. 14 illustrates the internal organization of each group 502 of 128 BEs, which forms a part of the network 500. As shown in FIG. 14, within a group 502, cross-bar switches 510 are arranged to provide full 8 bit wide interconnections between 16 groups (512) of BEs, each group 512 having 8 BEs.

Figure 15:
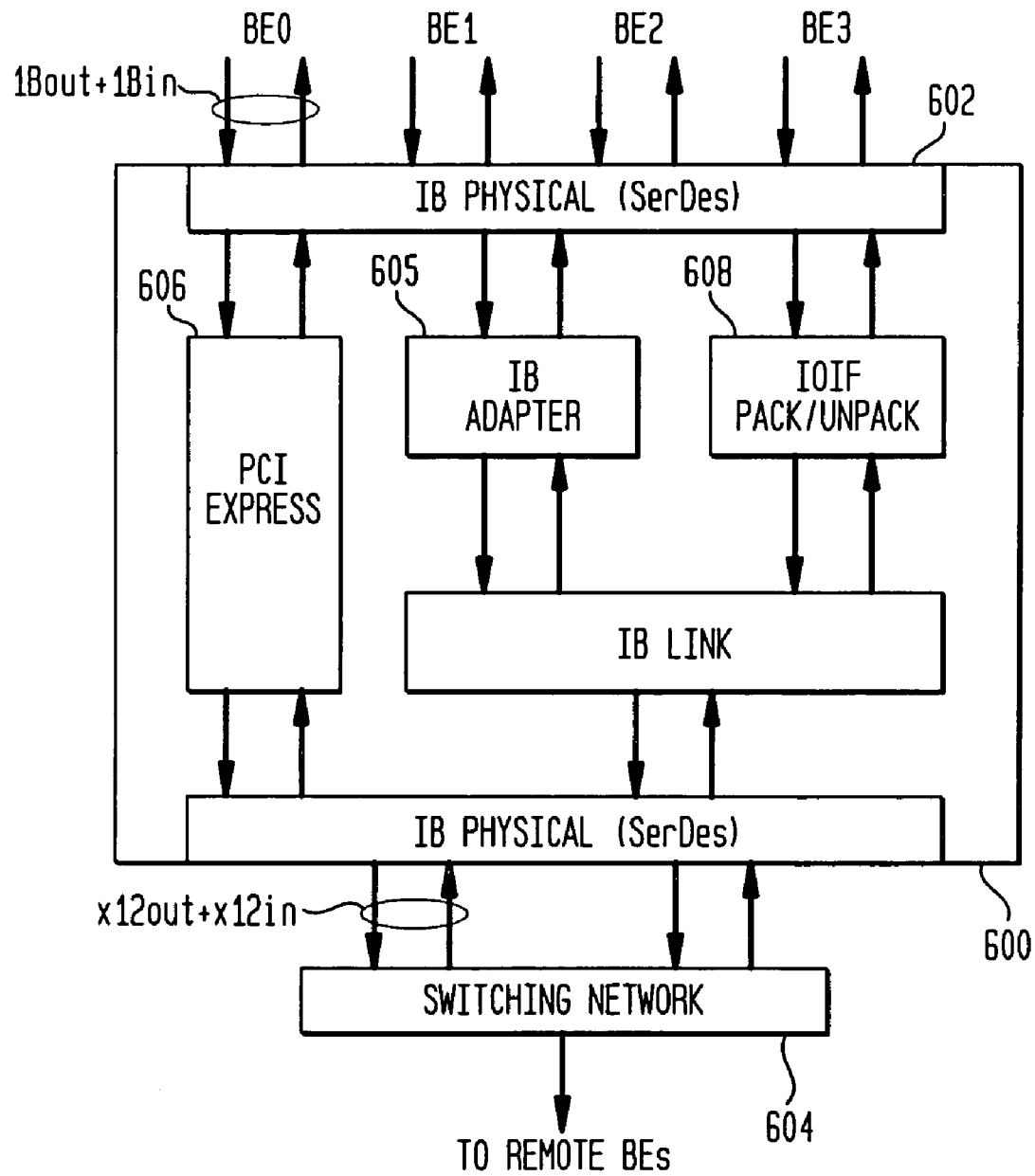

With reference to FIG. 15, attention will now be turned to a multiple protocol stack bridge device 600, for facilitating communications between BEs attached to an input output interface (IOIF) 602 and remote BEs or other devices through a switching network 604. Desirably, the switching network 604 is a high speed, high capacity, serial communications network, having a topology of a cross-bar switch, such as any of the switches 100, 300, or 400 shown and described above with reference to FIGS. 4 through 12. Communications over switching network 604 are required to be formatted according to the lower layers (physical layer, data link layer, and network layer) of the Infiniband™ protocol. However, BEs lack the capability of directly communicating over that protocol, having no Infiniband adapter of their own. Hence, bridge 600 has an IOIF adapter 602 for permitting communications of the BEs and an Infiniband adapter 605 for converting communications from IOIF protocol to Infiniband protocol for transport over switching network 604.

In addition to these adapters, bridge 600 also has other adapters for permitting communications according to layers of other communication protocols besides Infiniband. Hence, an adapter 606 is provided for support of the PCI express protocol, as well as another adapter 608 supporting an IOIF pack/unpack protocol, which is an alternative transport layer protocol to one or more upper layer protocols of the Infiniband protocol. The PCI Express protocol is an industry standard protocol supporting communications between some types of devices, e.g. videogame devices and other consumer electronics devices that are local to the bridge 600 (through IOIF 602), without crossing switching network 604.

As discussed above, the upper layers of the Infiniband protocol result in communications having high latency, which is undesirable for messaging between remote processors cooperating together on a large-scale computing project. With the addition of the IOIF pack/unpack protocol adapter 608, communications are streamlined through switching network 604 between local BEs BE0 ... BE3 and remote BEs. In such manner, the lowered overhead of the transport layer of the IOIF protocol results in lower latency than for communications using the transport layer protocol of Infiniband. However, no sacrifice in function has been made, because the bridge 600 still continues to support the upper layers of the Infiniband protocol through adapter 605. Thus, communications over bridge 600 can be transported using either the upper layers of the Infiniband protocol or the IOIF protocol.

An exemplary embodiment of an upper layer IOIF pack/unpack protocol will now be described, with reference to FIGS. 16-19. As discussed above, this upper layer IOIF protocol provides an alternative to the upper layer Infiniband protocol. Such upper layer IOIF protocol can be managed by an adapter 608 of a bridge 600 such as that described above relative to FIG. 15, for example.

The IOIF pack/unpack protocol stack layer includes new commands for reading and writing to remote storage. In this example, remote storage is that which only be accessed by passing through a bridge that is Infiniband-enabled, so that communications can be further transmitted through an Infiniband cross-bar switch to remote parts of the network.

Existing lower layers of the IOIF protocol restrict the maximum packet length to 128 bytes. One goal of the IOIF pack/unpack protocol stack layer is to allow IOIF packets to be gathered together by a bridge, e.g. bridge 600, and sent to remote parts of the network as one larger size packet having 2K, or 4K bytes, for example.

Figure 16:
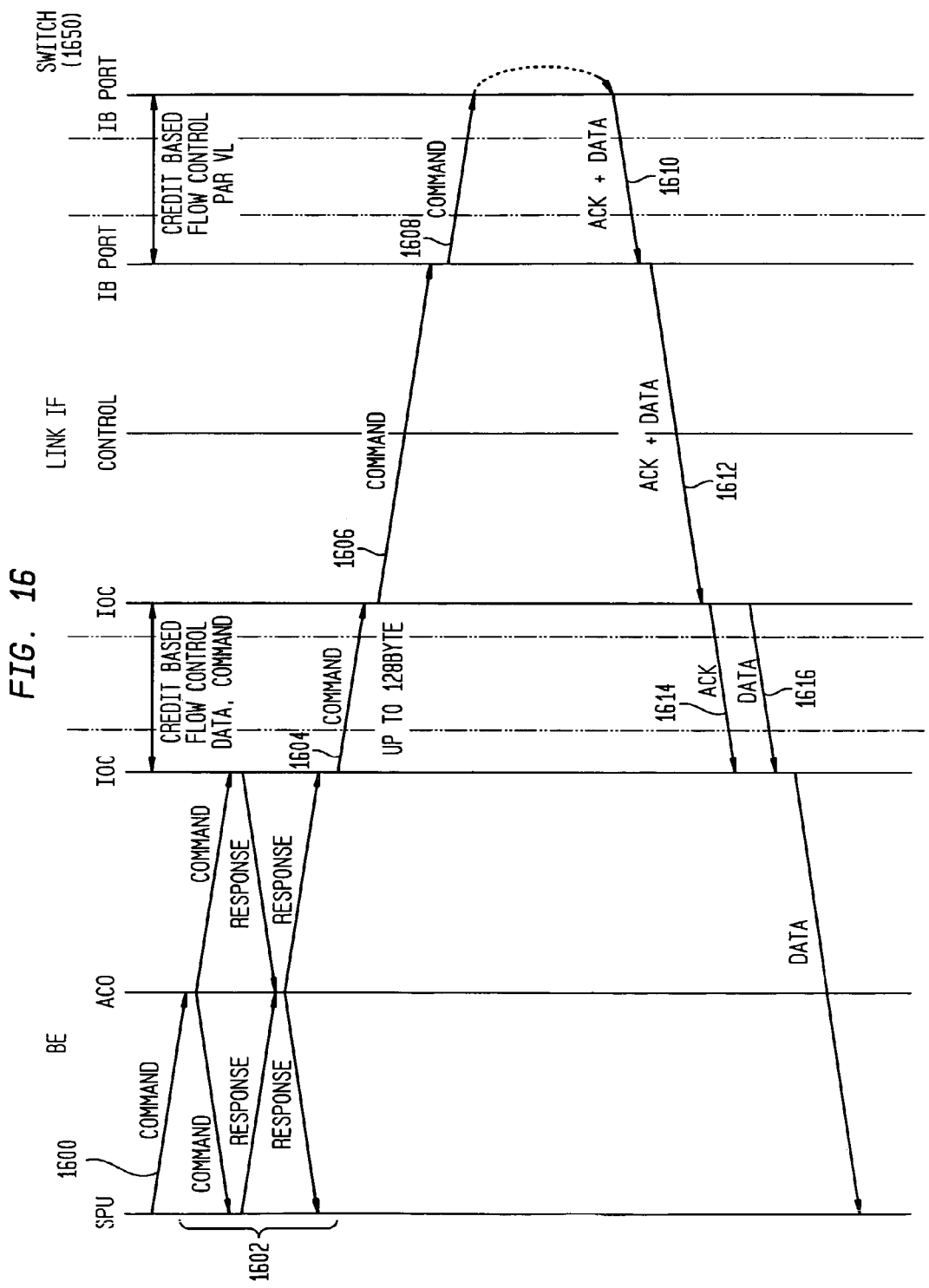

A communication sequence for a "direct read" command is illustrated in FIG. 16. In this sequence, a synergistic processor unit (SPU), one of many processors included within a BE, issues a read command 1600 to a remote device (a device not local to the bridge). Some initial signaling 1602 then occurs between the SPU, a cache concentrator (ACO) and an input output controller (IOC) for preserving cache coherency. Thereafter, the IOC takes over in handling communications to a remote processor located in the portion of the network labeled as "Switch" (1650), as indicated by commands 1604, 1606, 1608 and acknowledgement with data (ACK+DATA) signals 1610, 1612, and ACK signal 1614 and data signal 1616.

The IOC is an element of a bridge, e.g. bridge 600, which includes an input output interface (IOIF). The IOC implements a "credit-based flow control" such that a sender (the SPU) can only send packets to be buffered by the IOC up to a predetermined credit limit. After the credit limit is reached, the sender must wait until credits are replenished by the IOC before the IOC can buffer any more packets from that sender. The IOC replenishes credits to the sending SPU when it sends packets from the SPU in an outbound direction onto a network.

Such credit-based flow control is required for the IOC to operate in conformity with Infiniband specifications governing transport of communications in "virtual lanes." As defined in the Infiniband specification, virtual lanes are logically separate links on physically separate channels.

Figure 3A:
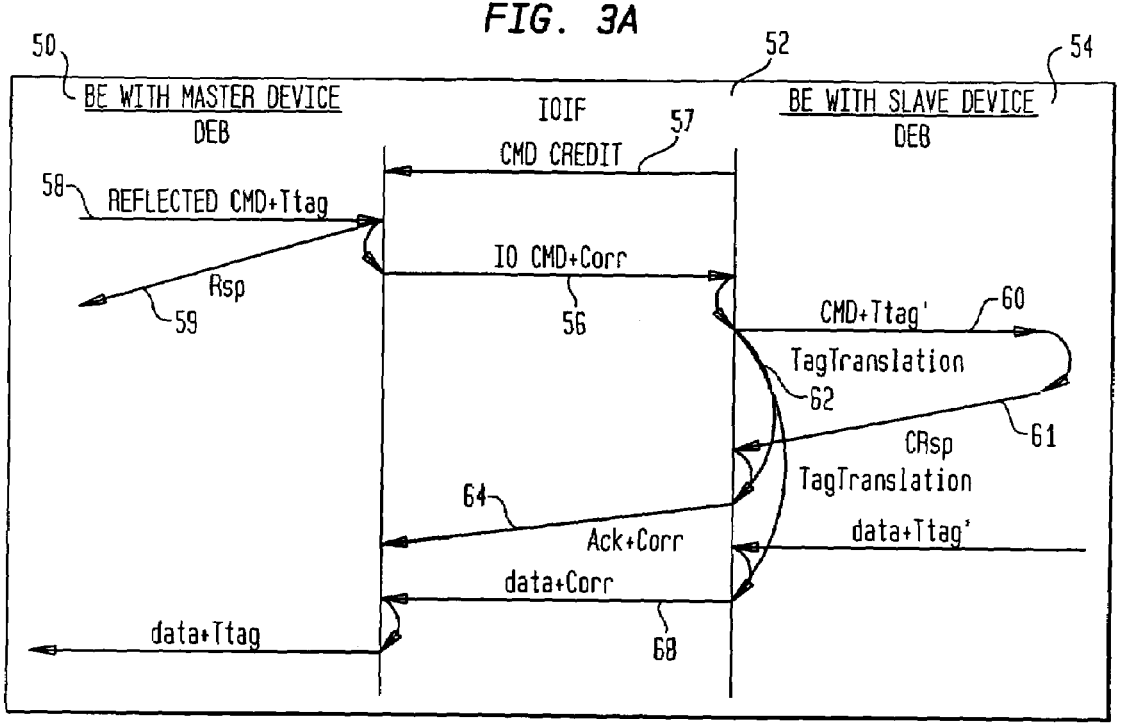
Figure 3B:
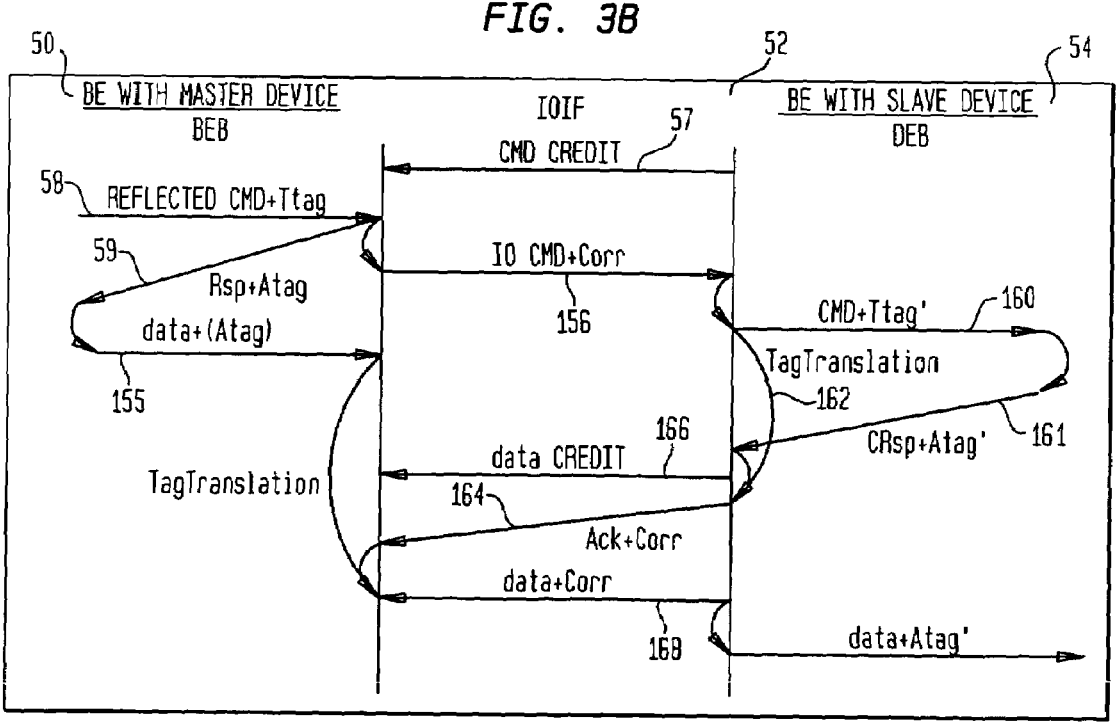

As shown in FIG. 16, a feature of the direct read command is that it does not require an acknowledgement (ACK) to be returned from the remote processor, which exists in the area labeled "Switch" (1650) in FIG. 16, to the requesting SPU before the remote processor returns the requested data. This differs from the protocol described in the background above relative to FIG. 3A in which the ACK must be returned separately by the remote processor, prior to the requested data being returned. With the elimination of the intervening ACK, lower latency is achieved.

Figure 17:
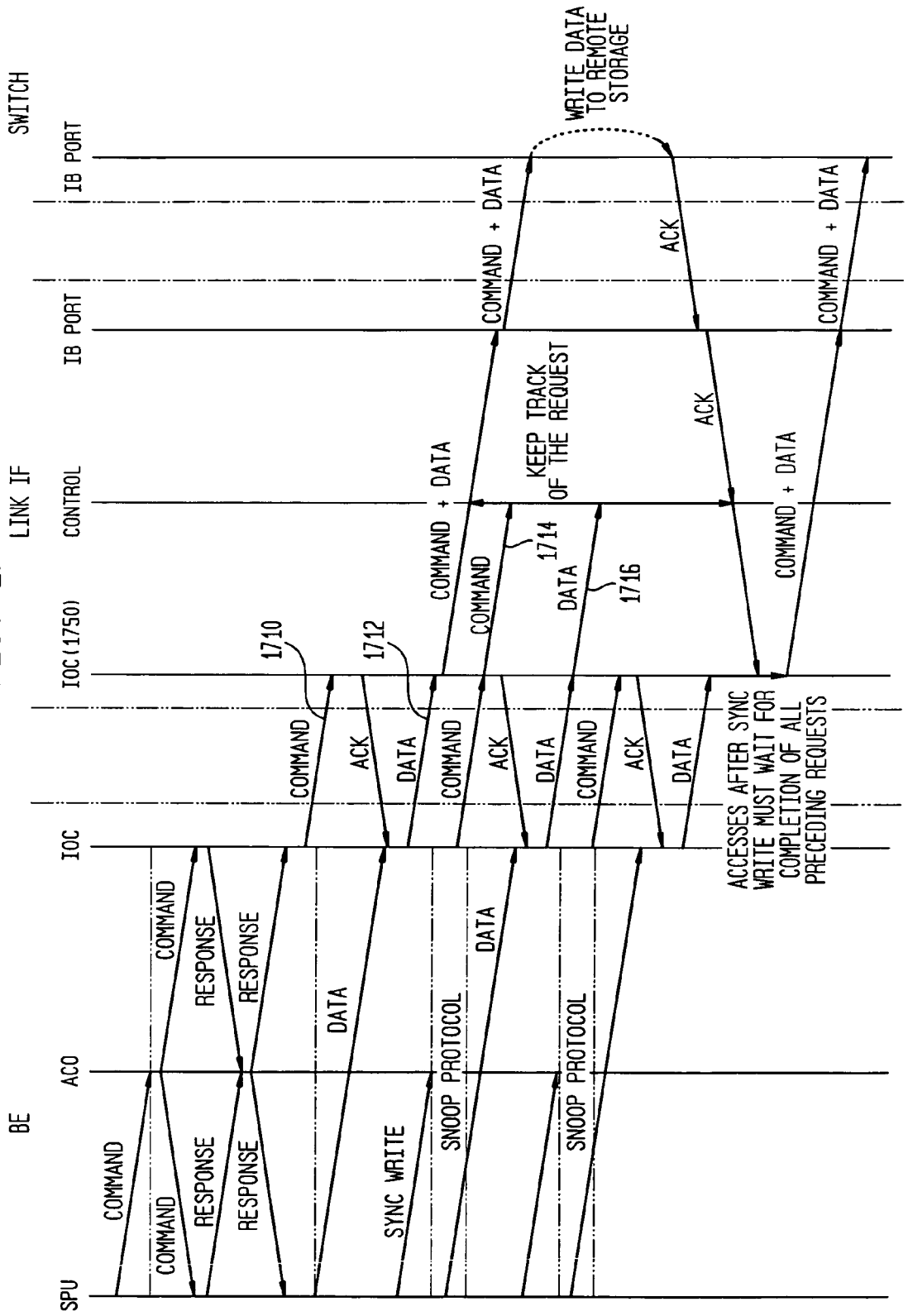

FIG. 17 illustrates a communication sequence for another feature of the protocol stack layer, the "sync write". The sync write command is a streamlined low latency transport layer command. A sync write command causes all access commands (read or write) that are issued after the "sync write" to wait until all preceding write commands are completed. The sync write command itself does not write any data—its purpose is only to order the later requests after the prior requests. In operation, a bridge, IOC (1700), detects the sync write command (1710) and stalls later accesses until the prior ones are completed. By use of the sync write command, assurance can be given that later issued read or write commands, e.g. command (1714), data (1716), which happen to be sooner at the remote processor will not be serviced ahead of earlier issued read or write commands that take longer to reach the remote processor.

After one sync write command (1710) is made to the bridge, the same operation continues indefinitely, in which later accesses, e.g. accesses 1714, 1716 must wait for prior write commands to complete. The sync write operation can apply to remote access (access through the remote side of the bridge), and also to local access (for example, to different BEs attached to the same bridge through an IOIF).

One way that the sync write command can be implemented is by a write command to a predefined address. The bridge can detect such sync write when it examines the command.

Figure 18:
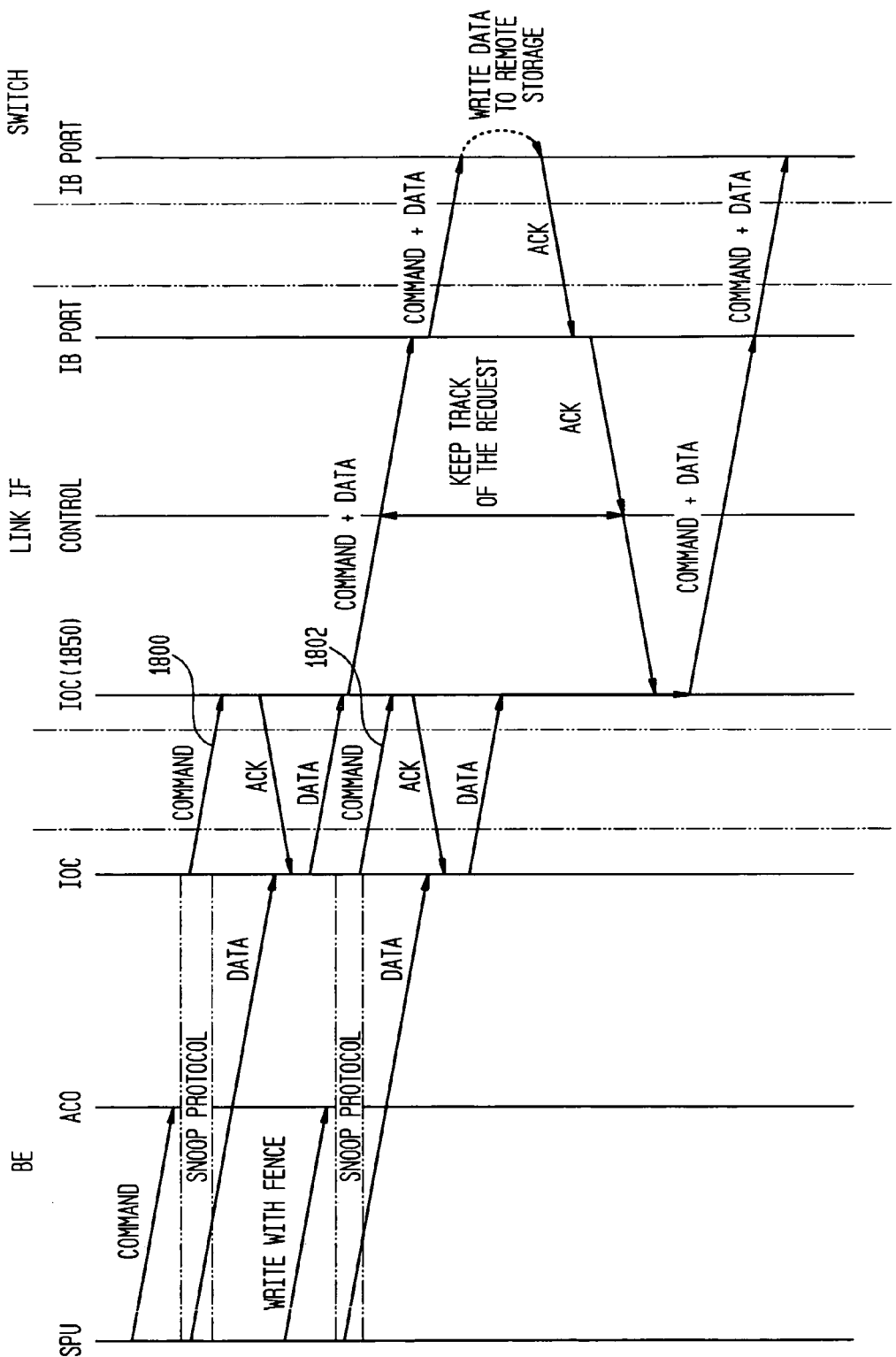
Figure 19:
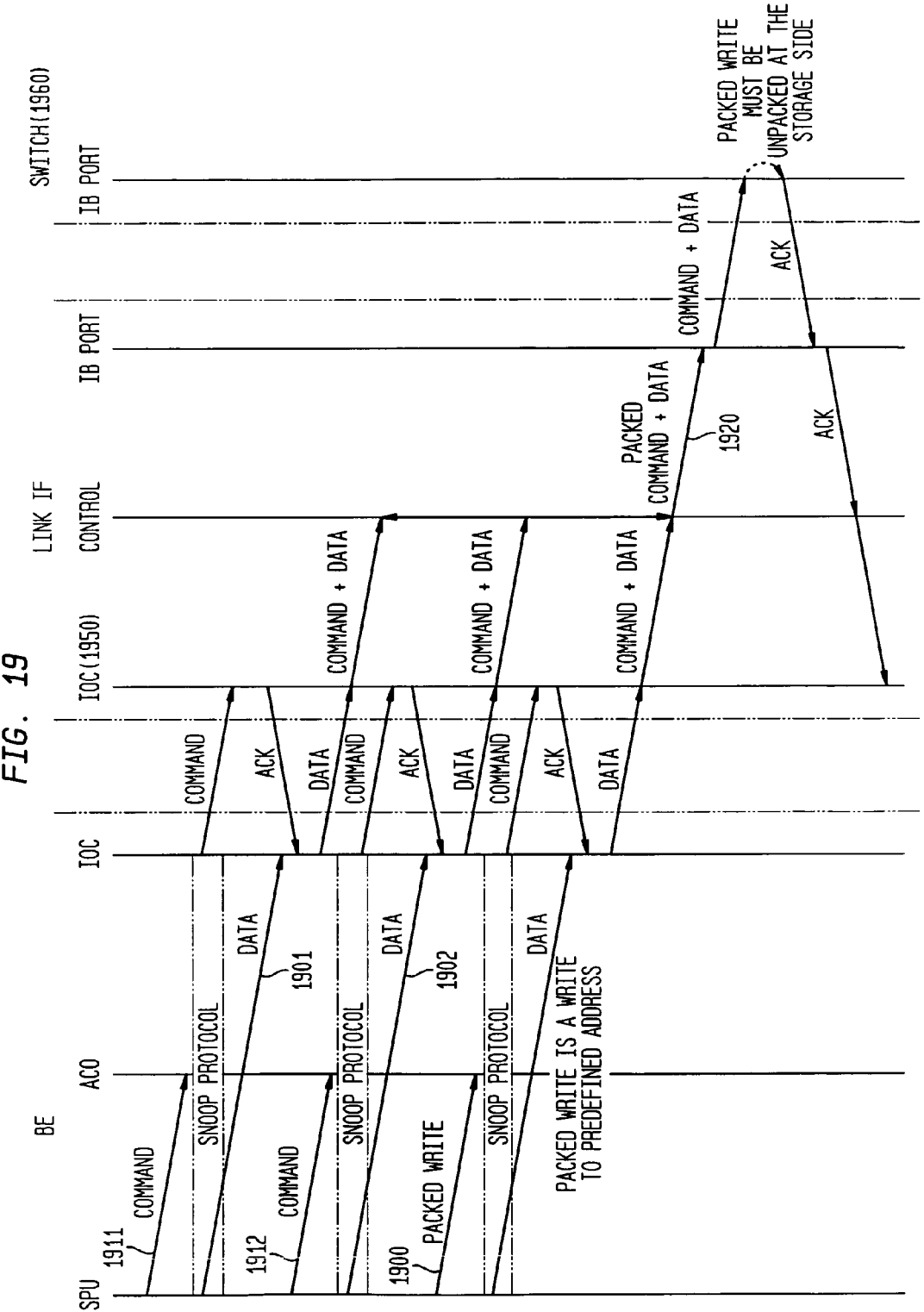

The term "snoop protocol" shown in FIGS. 17-19 indicates the signaling that occurs between the SPU, AC0 (cache concentrator) and IOC for preserving cache coherency. Such snoop protocol precedes the making of a read or write request to remote storage.

A communication sequence according to a "write with fence" command is illustrated in FIG. 18. This command is similar to the sync write command, except that it only applies to the current storage access command and only applies to remote storage. This differs from the sync write command, which applies to both local and remote access and applies to all future accesses.

The "write with fence" command causes the bridge, IOC (1850), to stall access to a particular virtual lane by the requesting SPU until all read or write accesses prior to issuance of the write with fence command are completed. Thereafter, normal access resumes as before. Thus, the first write command 1802 after a write with fence command 1800 must wait until all prior accesses are completed. However, the second write command issued after the write with fence command need not wait for the first command to complete that was issued after the write with fence. Like the sync write, this command can be implemented as a write to a predefined address.

A communication sequence illustrating the "packed write command" is illustrated in FIG. 19. The packed write command allows prior write commands to remote storage to be buffered in the bridge, IOC (1950), until the packed write command is issued. When the packed write is issued, the packets 1901, 1902 from each prior write command 1911, 1912 are ordered and gathered in a single packet 1920 to send through the switch 1960. In this manner, IOIF packets, which are limited to 128 bytes in length, can be gathered by the bridge IOC (1950) and packed into a larger packet having 2K or 4K length for sending across the switch to a remote part of the network.

The bridge, e.g. bridge 600 (FIG. 15), can be operated in either packing mode or non-packing mode. When the bridge operates in packing mode, all write commands are buffered in the bridge until a packed write command is issued. The first write command after a packed write command becomes the beginning of the next packet of the next packed write. Like the sync write and write with fence commands, this command is preferably implemented as a write to a predefined address.

As described in the foregoing, in very large networks it is desirable to provide a single large address space based on a sufficient number of address bits to permit each node of the network to be uniquely identified. In such manner, the various subportions of the network between a sending device and a receiving device can be traversed without the latency involved in requiring address translation at the input and output of each subportion.

Figure 20:
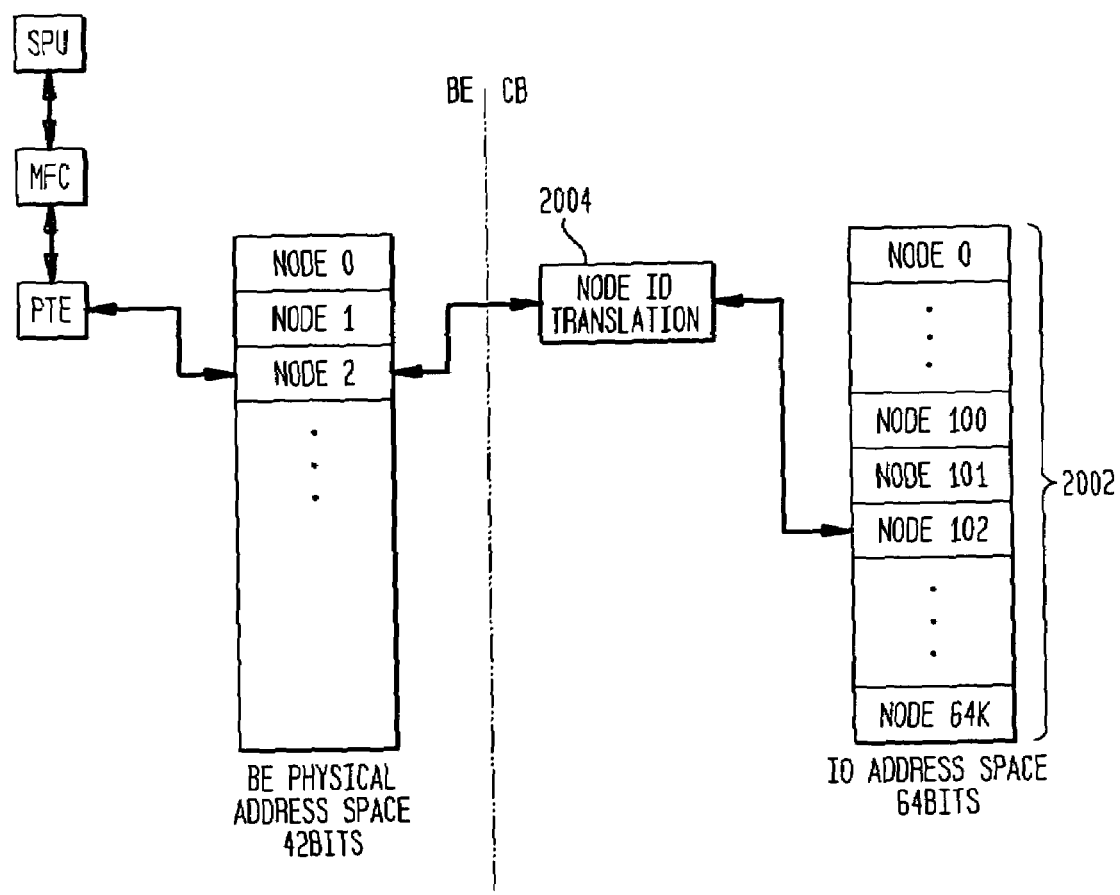

FIG. 20 illustrates such solution. In a BE, the physical address space is limited by the 42 address bits provided therefor. Therefore, packets entering and exiting the BE have only 42 bit address fields, to conform to requirements of the physical layer of IOIF protocol used by BEs. A cluster bridge (CB) provides an interface between the BE and a network 2002 of nodes. The network 2002 includes a very large number (64K) of nodes. In order to uniquely identify each node of the network, 64 address bits are required. Accordingly, address translation is provided by element 2004 of the cluster bridge (CB), such that packets now destined for the network 2002 contain appropriate 64 bit address fields. Conversely, packets destined for the BE are translated from having 64 bit address fields to having 42 bit address fields.

Figure 21:
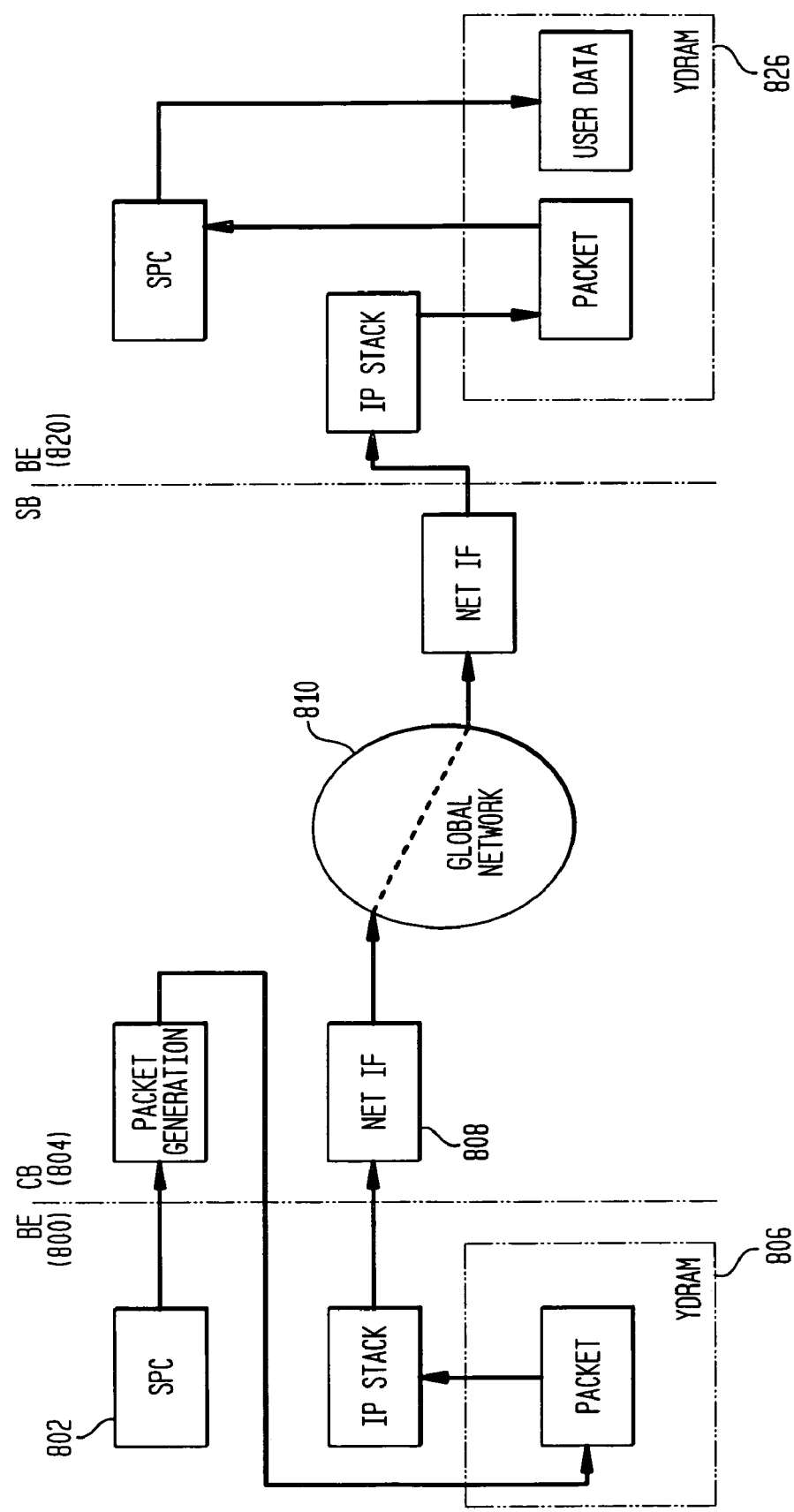

FIG. 21 illustrates exemplary modifications to a BE and a preferred operation thereof for providing remote direct memory access (RDMA) across a network. At a BE 800, the SPC 802 (SPU plus DMA controller) issues a command, for example, a remote access read or a remote access write command. One or more packets for carrying out the command are then generated by the cluster bridge CB (804). The packet(s) are then placed in a packet buffer of a dynamic random access memory (DRAM) 806 at the sending BE. In a preferred embodiment, the DRAM 806 is a Yellowstone™ DRAM (YDRAM), a next generation DRAM design to be offered under the name Rambus®. Without further intervention or supervision by the SPC 802, the packet(s) are then sent by a network interface adapter (Net IF 808) over a global network 810 via IP protocol to another remote DMA capable device such as BE 820. At the remote device 820, the packet(s) are buffered in the YDRAM 826 until such time as they can be handled directly by the remote device. Alternatively, the packet(s) are buffered in the YDRAM 826 until the SPC within the remote device has time to service the newly arrived packets. In such manner, the transfer of data between BEs 800, 820 located remote from each other can be accomplished in an effective manner without burdening the processors of such BEs with the task of supervising such transfers, making the BEs operate more efficiently, and the transfer of data more efficient.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A crossbar switch for permitting communication between a multiplicity of devices, comprising:
   an input interface coupled to outputs of each of a group of devices and operable to select first data output from a first device selected from said group of devices;

an output interface coupled to inputs of each of said group of devices and operable to output the first data to a second device selected from said group of devices;

a switch fabric coupled to the input interface for receiving the first data and coupled to the output interface for outputting the first data, the switch fabric including an m×n array of switch elements, m and n each being greater than or equal to two, each said switch element having a plurality of input ports operable to receive at least one bit per cycle, and a plurality of output ports operable to output at least one bit per cycle, such that said array is operable to transfer the first data between said input interface and said output interface in units of said at least one bit per cycle.

2. A cross-bar switch as claimed in claim 1, wherein each said switch element has a plurality X of said input ports, a plurality X of said output ports, and at least a plurality X/2 of data paths connectable between ones of said input ports and said output ports, such that each said switch element is operable to simultaneously conduct at least X/2 transfers between said input ports and said output ports in units of at least one bit.

3. The crossbar switch of claim 1 wherein said array includes an input row of said switch elements coupled to said input interface, an output row of said switch elements coupled to said output interface, and at least one interior row coupled between said input row and said output row, wherein each of said switch elements of said input row and said interior row are coupled to provide output to two switch elements of said array, and each of said switch elements of said interior row and said output row are coupled to receive input from two switch elements of said array.

4. The cross-bar switch of claim 1, wherein said input interface is operable to receive the first data output from the first device as parallel data and said output interface is operable to output the first data to the second device as parallel data, and said array is operable to transfer the first data between said input interface and said output interface as a plurality of bits per cycle through respective ones of said switch elements.

5. The crossbar switch of claim 1, wherein said input interface is operable to receive a single bit per cycle of the first data output from the first device and said output interface is operable to output a single bit per cycle of the first data to the second device, and said array is operable to transfer a single bit per cycle of the first data between said input interface and said output interface through respective ones of said switch elements.

6. An interconnection apparatus including a plurality of cross-bar switches, each crossbar switch being as claimed in claim 5, wherein said input interfaces of said plurality of cross-bar switches are each operable to receive a different single bit per cycle of a plurality of bits of the first data output per cycle as parallel data by the first device.

7. An interconnection apparatus as claimed in claim 6, wherein said output interfaces of said plurality of cross-bar switches are each operable to output a different single bit per cycle of the parallel data to the second device.

8. An interconnection apparatus as claimed in claim 7, wherein said input interfaces are further operable to transfer the parallel data to arrays of said plurality of cross-bar switches on a time-division multiplexed basis and said output interfaces are further operable to receive the parallel data from said arrays on a time-division multiplexed basis.

9. An interconnection apparatus including a plurality of cross-bar switches, each cross-bar switch being as claimed in claim 1, wherein said input interfaces of said cross-bar switches are each operable to transfer a different portion per cycle of a plurality of bits of the first data output per cycle as parallel data by the first device to said input ports of said switch elements of respective ones of said crossbar switches, and said output interfaces of said cross-bar switches are each operable to output a respective one of said different portions per cycle of the parallel data to the second device.

10. An interconnection apparatus as claimed in claim 9, wherein said input interfaces of said plurality of cross-bar switches are further operable to transfer the parallel data to said arrays of said plurality of said cross-bar switches on a time-division multiplexed basis and said output interfaces of said plurality of cross-bar switches are further operable to receive the parallel data from said arrays on a time-division multiplexed basis.

11. A cross-bar switch as claimed in claim 1, wherein said input interface is further operable to transfer the first data to said array on a time-division multiplexed basis and said output interface is further operable to receive the data from said array on a time-division multiplexed basis.

12. A method as claimed in claim 1, wherein the data is transferred through said array on a time-division multiplexed basis.

13. A method of communicating between a multiplicity of devices, comprising:

inputting first data output from a first device selected from a group of devices to an input interface, the input interface coupled to outputs of each of the group of devices and operable to select the first device and receive the first data;

transferring at least one bit per cycle of the first data received by said input interface to an output interface through a switch fabric coupled between the input interface and the output interface, the switch fabric including an m×n array of switch elements, m and n each being greater than or equal to two, each said switch element having a plurality of input ports operable to receive at least one bit per cycle, and a plurality of output ports operable to output at least one bit per cycle; and outputting the first data from said output interface to a second device selected from said group of devices, said output interface coupled to inputs of each of said group of devices and operable to select said second device and to output said first data.

14. A method as claimed in claim 13, wherein each said switch element has a plurality X of said input ports, a plurality X of said output ports, and at least a plurality X/2 of data paths connectable between ones of said input ports and said output ports, such that each said switch element simultaneously conducts at least X/2 transfers between said input ports and said output ports in units of at least one bit.

15. A method as claimed in claim 13 wherein said array includes an input row of said switch elements coupled to said input interface, an output row of said switch elements coupled to said output interface, and at least one interior row coupled between said input row and said output row, wherein each of said switch elements of said input row and said interior row is coupled to provide output to two switch elements of said array, and each of said switch elements of said interior row and said output row are coupled to receive input from two switch elements of said array.

16. A method as claimed in claim 13, wherein the first data is input from the first device to said input interface as parallel data, the first data is output to the second device from said output interface as parallel data, and the first data is transferred between said input interface and said output interface as a plurality of bits per cycle through respective ones of said input ports and said output ports of said switch elements.

17. A method as claimed in claim 16, further comprising inputting respective single bits of parallel data from the first device to respective ones of a plurality of said input interfaces, and for each said input interface, transferring the respective single bit per cycle between said input interface and one said output interface by an array of a plurality of said arrays, and outputting respective single bits of the parallel data per cycle to the second device through respective ones of a plurality of said output interfaces.

18. A method as claimed in claim 17, further comprising outputting a different single bit of the parallel data from said output interface of each respective one of said cross-bar switches.

19. A method as claimed in claim 18, wherein the parallel data is transferred to said arrays by said input interfaces on a time-division multiplexed basis and the parallel data is transferred from said arrays to said output interfaces on a time-division multiplexed basis.

20. A method as claimed in claim 16, further comprising inputting respective portions of parallel data from the first device to respective ones of a plurality of said input interfaces, and for each said input interface, transferring the respective portion per cycle between said input interface and one said output interface by an array of a plurality of said arrays, and outputting a respective portion of the parallel data per cycle to the second device through a respective one of a plurality of said output interfaces.

21. A method as claimed in claim 20, wherein the data is transferred through said arrays on a time-division multiplexed basis.

22. A method as claimed in claim 13, wherein the first data is input a single bit per cycle to said input interface, the first data is output a single bit per cycle from said output interface, and the first data is transferred a single bit per cycle through said array.

23. A method as claimed in claim 22, wherein each said input port of said switch elements is operable to input a single bit per cycle and each said output port of said switch elements is operable to output a single bit per cycle.

24. A cross-bar switch for permitting communication between a multiplicity of devices, comprising:

an input interface including a first element coupled to outputs of each of a first group of devices and operable to select first data output from a first transmitting device selected from the first group of devices, and a second element coupled to outputs of each of a second group of devices and operable to select second data output from a second transmitting device selected from the second group of devices;

an output interface including a first element coupled to inputs of each of said first group of devices and operable to output the first data to a first receiving device selected from said first group of devices and a second element coupled to inputs of each of said second group of devices and operable to output the second data to a second receiving device selected from said second group of devices;

a switch fabric coupled to receive the first and second data from the input interface simultaneously during a first time interval and coupled to output the first and second data to the output interface simultaneously during a second time interval, the switch fabric including an m×n array of switch elements, m and n each being greater than or equal to two, each said switch element having a plurality of input ports operable to receive at least one bit per cycle, and a plurality of output ports operable to output at least one bit per cycle, such that said array is operable to simultaneously transfer the first and second data between said input interface and said output interface in units of said at least one bit per cycle.

* * * * *